(12) United States Patent
Jain et al.

(10) Patent No.: US 9,262,253 B2
(45) Date of Patent: Feb. 16, 2016

(54) MIDDLEBOX RELIABILITY

(75) Inventors: Navendu Jain, Seattle, WA (US); Rahul Potharaju, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/536,782

(22) Filed: Jun. 28, 2012

(65) Prior Publication Data

US 2014/0006862 A1 Jan. 2, 2014

(51) Int. Cl.
*G06F 11/00* (2006.01)
*G06F 11/07* (2006.01)
*H04L 12/24* (2006.01)

(52) U.S. Cl.
CPC .......... *G06F 11/0781* (2013.01); *G06F 11/008* (2013.01); *G06F 11/0736* (2013.01); *H04L 41/0604* (2013.01); *H04L 41/065* (2013.01)

(58) Field of Classification Search
CPC . G06F 11/008; G06F 11/079; G06F 11/0766; G06F 11/0781; H04L 41/0604; H04L 41/065; H04L 41/145; H04L 41/147; H04L 41/5025; H04L 43/0805
USPC .................... 714/26, 47.1, 47.3, 48
See application file for complete search history.

(56) References Cited

U.S. PATENT DOCUMENTS

| | | | |
|---|---|---|---|
| 4,816,994 A | 3/1989 | Freiling et al. | |
| 5,483,637 A * | 1/1996 | Winokur et al. | 714/26 |
| 6,118,936 A | 9/2000 | Lauer et al. | |
| 6,131,112 A | 10/2000 | Lewis et al. | |
| 6,249,755 B1 * | 6/2001 | Yemini et al. | 702/183 |
| 6,353,902 B1 * | 3/2002 | Kulatunge et al. | 714/712 |
| 6,742,141 B1 | 5/2004 | Miller | |
| 6,785,226 B1 | 8/2004 | Oltman et al. | |
| 6,820,221 B2 | 11/2004 | Fleming | |
| 6,829,734 B1 | 12/2004 | Kreulen et al. | |
| 7,010,593 B2 | 3/2006 | Raymond | |
| 7,039,828 B1 | 5/2006 | Meyer et al. | |
| 7,047,291 B2 | 5/2006 | Breese et al. | |
| 7,085,697 B1 | 8/2006 | Rappaport et al. | |
| 7,209,923 B1 | 4/2007 | Cooper | |

(Continued)

FOREIGN PATENT DOCUMENTS

| | | |
|---|---|---|
| EP | 2037625 A1 | 3/2009 |
| WO | 97/24839 A2 | 7/1997 |

(Continued)

OTHER PUBLICATIONS

Ellram, L. et al.; "Total Cost of Ownership: A Key Concept in Strategic Cost Management Decisions"; Journal of Business Logistics; vol. 19, No. 1; 1998; pp. 55-84.

(Continued)

*Primary Examiner* — Marc Duncan
(74) *Attorney, Agent, or Firm* — Alin Corie; Sandy Swain; Micky Minhas

(57) ABSTRACT

The discussion relates to middlebox reliability. One example can apply event filters to a dataset of middlebox error reports to separate redundant middlebox error reports from a remainder of the middlebox error reports of the dataset. The example can categorize the remainder of the middlebox error reports of the dataset by middlebox device type. The example can also generate a graphical user interface that conveys past reliability and predicted future reliability for an individual model of an individual middlebox device type.

21 Claims, 7 Drawing Sheets

METHOD 700

(56) References Cited

U.S. PATENT DOCUMENTS

| | | | |
|---|---|---|---|
| 7,228,453 B2 | 6/2007 | O'Brien et al. | |
| 7,246,159 B2 | 7/2007 | Aggarwal et al. | |
| 7,313,736 B2 * | 12/2007 | Scrandis et al. | 714/47.3 |
| 7,315,887 B1 | 1/2008 | Liang et al. | |
| 7,451,210 B2 * | 11/2008 | Gupta et al. | 709/224 |
| 7,539,907 B1 * | 5/2009 | Johnsen et al. | 714/47.2 |
| 7,565,661 B2 | 7/2009 | Sim-Tang | |
| 7,580,956 B1 * | 8/2009 | Xin et al. | |
| 7,596,083 B2 | 9/2009 | Klos et al. | |
| 7,813,298 B2 | 10/2010 | Lidstrom et al. | |
| 7,853,544 B2 | 12/2010 | Scott et al. | |
| 7,965,620 B2 | 6/2011 | Gadgil et al. | |
| 7,995,485 B1 | 8/2011 | Anderson et al. | |
| 8,032,489 B2 | 10/2011 | Villella et al. | |
| 8,046,637 B2 * | 10/2011 | Gross et al. | 714/26 |
| 8,107,363 B1 | 1/2012 | Saluja | |
| 8,112,667 B2 | 2/2012 | Belluomini et al. | |
| 8,135,995 B2 * | 3/2012 | Ngai et al. | 714/45 |
| 8,161,325 B2 | 4/2012 | Calman et al. | |
| 8,169,921 B2 | 5/2012 | Yang et al. | |
| 8,181,071 B2 | 5/2012 | Cahill et al. | |
| 8,195,692 B2 | 6/2012 | Baek et al. | |
| 8,260,893 B1 | 9/2012 | Bandhole et al. | |
| 8,738,968 B2 * | 5/2014 | Kanso et al. | 714/40 |
| 8,831,202 B1 | 9/2014 | Abidogun et al. | |
| 8,838,599 B2 | 9/2014 | Xu et al. | |
| 8,862,948 B1 * | 10/2014 | Lam | 714/47.3 |
| 8,892,550 B2 | 11/2014 | Chu-Carroll et al. | |
| 8,892,960 B2 * | 11/2014 | Sambamurthy et al. | 714/47.3 |
| 8,996,539 B2 | 3/2015 | Agrawal et al. | |
| 9,065,730 B2 * | 6/2015 | Craig et al. | |
| 2002/0124214 A1 * | 9/2002 | Ahrens et al. | 714/57 |
| 2002/0156817 A1 | 10/2002 | Lemus | |
| 2002/0161873 A1 | 10/2002 | McGuire | |
| 2002/0174384 A1 * | 11/2002 | Graichen et al. | 714/37 |
| 2003/0014462 A1 | 1/2003 | Bennett et al. | |
| 2003/0023719 A1 * | 1/2003 | Castelli et al. | 709/224 |
| 2003/0034995 A1 * | 2/2003 | Osborn et al. | 345/713 |
| 2003/0046615 A1 * | 3/2003 | Stone | 714/47 |
| 2003/0093481 A1 * | 5/2003 | Mitchell et al. | 709/206 |
| 2003/0110408 A1 | 6/2003 | Wells et al. | |
| 2003/0123446 A1 | 7/2003 | Muirhead et al. | |
| 2003/0172046 A1 | 9/2003 | Scott | |
| 2004/0088386 A1 | 5/2004 | Aggarwas | |
| 2004/0225952 A1 | 11/2004 | Brown et al. | |
| 2005/0138170 A1 * | 6/2005 | Cherkasova et al. | 709/225 |
| 2005/0138486 A1 | 6/2005 | Gromyko | |
| 2005/0154690 A1 | 7/2005 | Nitta et al. | |
| 2005/0171948 A1 | 8/2005 | Knight | |
| 2005/0181835 A1 | 8/2005 | Lau et al. | |
| 2005/0188240 A1 | 8/2005 | Murphy et al. | |
| 2005/0222811 A1 * | 10/2005 | Jakobson et al. | 702/183 |
| 2005/0276217 A1 | 12/2005 | Gadgil et al. | |
| 2006/0179432 A1 | 8/2006 | Walinga et al. | |
| 2006/0218267 A1 | 9/2006 | Khan et al. | |
| 2007/0028139 A1 | 2/2007 | Wahl et al. | |
| 2007/0192406 A1 | 8/2007 | Frietsch et al. | |
| 2008/0016412 A1 * | 1/2008 | White et al. | 714/48 |
| 2008/0077682 A1 | 3/2008 | Nair et al. | |
| 2008/0291822 A1 | 11/2008 | Farkas et al. | |
| 2009/0055684 A1 | 2/2009 | Jamjoom et al. | |
| 2009/0063387 A1 | 3/2009 | Beaty et al. | |
| 2009/0138306 A1 * | 5/2009 | Coburn et al. | 705/7 |
| 2009/0183030 A1 * | 7/2009 | Bethke et al. | 714/37 |
| 2009/0262650 A1 | 10/2009 | Shaikh et al. | |
| 2010/0034080 A1 | 2/2010 | Charzinski et al. | |
| 2010/0049590 A1 | 2/2010 | Anshul | |
| 2010/0100775 A1 * | 4/2010 | Slutsman et al. | 714/47 |
| 2010/0124165 A1 | 5/2010 | Yang et al. | |
| 2010/0125745 A1 * | 5/2010 | Kogan et al. | 714/1 |
| 2010/0131952 A1 | 5/2010 | Akiyama et al. | |
| 2010/0138688 A1 | 6/2010 | Sykes et al. | |
| 2010/0189113 A1 | 7/2010 | Csaszar et al. | |
| 2010/0218104 A1 | 8/2010 | Lewis | |
| 2010/0287403 A1 * | 11/2010 | Jenkins et al. | 714/2 |
| 2010/0302940 A1 | 12/2010 | Patel et al. | |
| 2010/0313070 A1 | 12/2010 | Joshi et al. | |
| 2010/0332911 A1 * | 12/2010 | Ramananda et al. | 714/45 |
| 2011/0087522 A1 | 4/2011 | Beaty et al. | |
| 2011/0153539 A1 | 6/2011 | Rojahn | |
| 2011/0191623 A1 | 8/2011 | Dennert | |
| 2011/0239050 A1 * | 9/2011 | Malisetti et al. | 714/37 |
| 2011/0276836 A1 * | 11/2011 | Kahana et al. | 714/38.1 |
| 2011/0289076 A1 | 11/2011 | Boyle et al. | |
| 2011/0313962 A1 | 12/2011 | Jones et al. | |
| 2012/0185582 A1 | 7/2012 | Graessley | |
| 2012/0185735 A1 * | 7/2012 | Sambamurthy et al. | 714/47.1 |
| 2012/0213081 A1 | 8/2012 | Satoshi | |
| 2012/0213227 A1 | 8/2012 | Jaeger | |
| 2012/0218104 A1 | 8/2012 | Lai | |
| 2012/0239975 A1 | 9/2012 | Bodke et al. | |
| 2012/0245924 A1 | 9/2012 | Brun | |
| 2012/0254395 A1 | 10/2012 | Bonas | |
| 2012/0263044 A1 | 10/2012 | Akahane et al. | |
| 2012/0290715 A1 | 11/2012 | Dinger et al. | |
| 2013/0097304 A1 * | 4/2013 | Asthana et al. | 709/224 |
| 2013/0138419 A1 * | 5/2013 | Lopez et al. | 703/21 |
| 2013/0204808 A1 * | 8/2013 | Jiang et al. | 706/12 |
| 2013/0226525 A1 * | 8/2013 | Marwah et al. | 702/186 |
| 2013/0227115 A1 | 8/2013 | Hobbs et al. | |
| 2013/0286852 A1 | 10/2013 | Bowler et al. | |
| 2013/0290783 A1 | 10/2013 | Bowler et al. | |
| 2013/0291034 A1 | 10/2013 | Basile et al. | |
| 2013/0332145 A1 | 12/2013 | Bostick et al. | |
| 2013/0332399 A1 * | 12/2013 | Reddy et al. | 706/12 |
| 2014/0006861 A1 | 1/2014 | Jain et al. | |
| 2014/0047271 A1 * | 2/2014 | Gray et al. | 714/25 |
| 2014/0136684 A1 | 5/2014 | Jain et al. | |
| 2014/0136690 A1 | 5/2014 | Jain et al. | |
| 2014/0325019 A1 * | 10/2014 | Austin et al. | 709/217 |
| 2014/0379895 A1 | 12/2014 | Jain | |
| 2015/0006519 A1 | 1/2015 | Jain et al. | |
| 2015/0032500 A1 * | 1/2015 | Cope et al. | 705/7.28 |
| 2015/0221109 A1 * | 8/2015 | Klein | H04L 43/0811 345/440 |
| 2015/0271192 A1 * | 9/2015 | Crowley | H04L 43/12 726/22 |

FOREIGN PATENT DOCUMENTS

| | | |
|---|---|---|
| WO | 9847265 A1 | 10/1998 |
| WO | 2014/078592 A2 | 5/2014 |
| WO | 2014/078668 A2 | 5/2014 |

OTHER PUBLICATIONS

Kececioglu, D.; "Maintainability, availability, and operational readiness engineering handbook"; vol. 1; DEStech Publications, Inc.; 2002; pp. 24 and 27-29.

Wundsam, et al., "OFRewind: Enabling Record and Replay Troubleshooting for Networks", Retrieved at <<http://www.usenix.org/event/atc11/tech/final_files/Wundsam.pdf>>, USENIXATC'11 Proceedings of the 2011 USENIX conference on USENIX annual technical conference, 2011, pp. 1-14.

"A Practitioner's Guide to More Efficient Network Management", Retrieved at <<http://h10124.www1.hp.com/campaigns/us/en/software/images/Practitioners_Guide.pdf>>, Retrieved Date: Feb. 8, 2012, pp. 8.

"Enterprise Network and Data Security Spending Shows Remarkable Resilience", Retrieved at <<http://www.abiresearch.com/press/3591-Enterprise+Network+and+Data+Security+Spending+Shows+Remarkable+Resilience>>, Jan. 2011, pp. 5.

Allman, Mark, "On the Performance of Middleboxes", Retrieved at <<http://citeseerx.ist.psu.edu/viewdoc/download?doi=10.1.1.77.9560&rep=rep1&type=pdf, In Proceedings of Sigcomm IMC. ACM, 2003, pp. 6.

Biggadike, et al., "NATBLASTER: Establishing TCP Connections between Hosts Behind NATs", Retrieved at <<http://sparrow.ece.cmu.edu/~adrian/projects/natblaster.pdf>>, In ACM Sigcomm Workshop, 2005, pp. 10.

(56) References Cited

OTHER PUBLICATIONS

Carpenter, B., "Middleboxes: Taxonomy and Issues", Retrieved at <<http://tools.ietf.org/pdf/rfc3234.pdf>>, Feb. 2002, pp. 1-27.

Casado, et al., "Ethane: Taking Control of the Enterprise", Retrieved at <<http://yuba.stanford.edu/~casado/ethane-sigcomm07.pdf>>, ACM Sigcomm CCR, 2007, pp. 12.

Case, et al., "A Simple Network Management Protocol", Retrieved at <<http://www.ietf.org/rfc/rfc1157.txt>>, May 1990, pp. 34.

Eppinger, Jeffrey., "TCP Connections for P2P Apps: A Software Approach to Solving the NAT Problem", Retrieved at <<http://reports-archive.adm.cs.cmu.edu/anon/isri2005/CMU-ISRI-05-104.pdf>>, CMU-ISRI-05-104, Jan. 2005, pp. 1-8.

Gill, et al., "Understanding Network Failures in Data Centers: Measurement, Analysis, and Implications", Retrieved at <<http://www.cs.uccs.edu/~zbo/teaching/CS522/Projects/SIGCOMM11-DCFailure.pdf>>, In Proceedings of Sigcomm, 2011, pp. 350-361.

Greenberg, et al., "VI2: A Scalable and Flexible Data Center Network", Retrieved at <<http://www.cs.cmu.edu/afs/.cs.cmu.edu/Web/People/prs/15-744-F11/papers/vl2.pdf>>, ACM Sigcomm CCR, 2009, pp. 12.

Greenberg, et al., "A Clean Slate 4D Approach to Network Control and Management", Retrieved at <<http://www.cs.cmu.edu/~4d/papers/greenberg-ccr05.pdf>>, ACM Sigcomm CCR, 2005, pp. 12.

Guo, et al., "BCube: A High Performance, Server-Centric Network Architecture for Modular Data Centers", Retrieved at <<http://research.microsoft.com/pubs/81063/comm136-guo.pdf>>, In ACM Sigcomm CCR, 2009, pp. 12.

Hancock, et al., "Next Steps in Signaling (NSIS): Framework", Retrieved at <<http://cabernet.tools.ietf.org/pdf/rfc4080.pdf>>, Jun. 2005, pp. 1-49.

Johnson, D., "NOC Internal Integrated Trouble Ticket System", Retrieved at <<http://tools.ietf.org/pdf/rfc1297.pdf>>, Jan. 1992, pp. 1-12.

Joseph, et al., "A Policy-aware Switching Layer for Data Centers", Retrieved at <<http://ccr.sigcomm.org/drupal/files/p51-josephA.pdf>>, In ACM Sigcomm CCR, 2008, pp. 51-62.

Kalchschmidt, et al., "Inventory Management in a Multi-Echelon Spare Parts Supply Chain", Retrieved at <<http://read.pudn.com/downloads142/sourcecode/others/617477/inventory%20supply%20chain/04051312322413213(1).pdf>>, Journal of Production Economics, 2003, pp. 397-413.

Kandula, et al., "Detailed Diagnosis in Enterprise Networks", Retrieved at <<http://ccr.sigcomm.org/online/files/p243.pdf>>, In ACM Sigcomm CCR, 2009, pp. 243-254.

Labovitz, et al., "Experimental Study of Internet Stability and Backbone Failures", Retrieved at <<http://ieeexplore.ieee.org/stamp/stamp.jsp?tp=&arnumber=781062>>, In Fault-Tolerant Computing, IEEE, 1999, pp. 1-8.

Lockwood, John W., "An Open Platform for Development of Network Processing Modules in Reprogrammable Hardware", Retrieved at <<http://algo-logic.com/~jwlockwd/publications/designcon2001_fpx_platform.pdf>>, IEC DesignConaˇA 'Z01, 2001, pp. 1-10.

Markopoulou, et al., "Characterization of Failures in an IP Backbone", Retrieved at <<http://ieeexplore.ieee.org/stamp/stamp.jsp?tp=&arnumber=4456903>>, IEEE/ACM Transactions on Networking, vol. 16, No. 4, Aug. 2008, pp. 749-762.

McCloghrie, et al., "Management Information Base for Network Management of TCP/IP-based Internets", Retrieved at <<http://www.ietf.org/rfc/rfc1213.txt>>, Mar. 1991, pp. 66.

Mudigonda, et al., "NetLord: A Scalable Multi-Tenant Network Architecture for Virtualized Datacenters", Retrieved at <<http://www.hpl.hp.com/personal/Praveen_Yalagandula/papers/SIGCOMM2011-Netlord.pdf>>, In Proceedings of ACM Sigcomm, 2011, pp. 12.

Mysore, et al., "PortLand: A Scalable Fault-Tolerant Layer 2 Data Center Network Fabric", Retrieved at <<http://cseweb.ucsd.edu/~vahdat/papers/portland-sigcomm09.pdf>>, In Proceedings of Sigcomm CCR, ACM, 2009, pp. 12.

Padmanabhan, et al., "A Study of End-to-End Web Access Failures", Retrieved at <<http://citeseerx.ist.psu.edu/viewdoc/download?doi=10.1.1.71.4884&rep=rep1&type=pdf>>, In CoNext. ACM, 2006, pp. 13.

Sekar, et al., "The Middlebox Manifesto: Enabling Innovation in Middlebox Deployment", Retrieved at <<http://www.cs.unc.edu/~reiter/papers/2011/HotNets.pdf>>, In Proceedings HotNets, 2011, pp. 1-6.

Shaikh, et al., "A Case Study of OSPF Behavior in a Large Enterprise Network", Retrieved at <<http://citeseerx.ist.psu.edu/viewdoc/download?doi=10.1.1.88.8850&rep=rep1&type=pdf>>, In ACM Sigcomm WIM, 2002, pp. 14.

Srisuresh, et al., "Middlebox Communication Architecture and Framework", Retrieved at <<http://www.ietf.org/rfc/rfc3303.txt>>, Aug. 2002, pp. 32.

Stiemerling, et al., "Middlebox Communication (MIDCOM) Protocol Semantics", Retrieved at <<http://citeseerx.ist.psu.edu/viewdoc/download?doi=10.1.1.182.7835&rep=rep1&type=pdf>>, Mar. 2008, pp. 1-70.

Swale, et al., "Middlebox Communications Protocol Requirements", Retrieved at <<http://www.ietf.org/rfc/rfc3304.txt>>, Aug. 2002, pp. 1-9.

Turner, et al., "California Fault Lines: Understanding the Causes and Impact of Network Failures", Retrieved at <<http://cseweb.ucsd.edu/~snoeren/papers/cenic-sigcomm10.pdf>>, In ACM Sigcomm CCR, 2010, pp. 12.

Walfish, et al., "Middleboxes No Longer Considered Harmful", Retrieved at <<http://www.usenix.org/event/osdi04/tech/full_papers/walfish/walfish.pdf>>, In Proceedings of SOSDI. USENIX Association, 2004, pp. 215-230.

Watson, et al., "Experiences with Monitoring OSPF on a Regional Service Provider Network", Retrieved at <<http://www.eecs.umich.edu/techreports/cse/03/CSE-TR-477-03.pdf>>, In ICDCS. IEEE, 2003, pp. 12.

Harris, Chandler., "Data Center Outages Generate Big Losses", Retrieved at <<http://www.informationweek.com/news/hardware/data_centers/229500121>>, May 12, 2011, pp. 9.

Abu-Libdeh,et al., "Symbiotic routing in future data centers", Retrieved at <<http://research.microsoft.com/en-us/um/people/antr/publications/sigcomm10-camcube.pdf>>, Proceedings of SIGCOMM, Aug. 30, 2010-Sep. 3, 2010, pp. 12.

Al-Fares, et al., "A scalable, commodity data center network architecture", Retrieved at <<http://ccr.sigcomm.org/online/files/p63-alfares.pdf>>, Proceedings of SIGCOMM, 2008, Aug. 17-22, 2008, pp. 63-74.

Alizadeh, et al., "Data Center TCP (DCTCP)". Retrieved at <<http://ccr.sigcomm.org/online/files/p63_0.pdf>>, Proceedings of SIGCOMM, Aug. 30, 2010-Sep. 3, 2010, pp. 63-74.

Bakkaloglu, M. et al.; "On Correlated Failures in Survivable Storage Systems"; Technical Report CMU-CS-02-129; Carnegie Mellon University; Pittsburgh PA; May 2002; 37 pages.

Bansal, N. et al.; "Towards Optimal Resource Allocation in Partial-Fault Tolerant Applications"; Infocom; 2008; 10 pages.

Benson, et al., "Network traffic characteristics of data centers in the wild", Retrieved at <<http://conferences.sigcomm.org/imc/2010/papers/p267.pdf>>, Proceedings of IMC, 2010, Nov. 1-3, 2010, pp. 267-280.

Benson, et al., "A first look at problems in the cloud", Retrieved at <<http://www.usenix.org/events/hotcloud10/tech/full_papers/Benson.pdf>>, Proceedings of Hot Cloud, 2010, pp. 1-7.

"Better Predict and Prevent Network Failure—Monolith Software for Network Management", Retrieved at <<http://www.monolith-software.com/solutions/network-management.php>>, Retrieved Date: Oct. 19, 2011, pp. 2.

Brodkin, Jon, "Amazon EC2 outage calls 'availability zones' into question", Retrieved at <<http://www.networkworld.com/news/2011/042111-amazon-ec2-zones.html>>, Apr. 21, 2011, pp. 8.

Chen, et al., "Declarative configuration management for complex and dynamic networks", Retrieved at <<http://www2.research.att.com/~kobus/docs/coolaid.pdf>>,Proceedings of CoNEXT, Nov. 30, 2010-Dec. 3, 2010, pp. 12.

(56) References Cited

OTHER PUBLICATIONS

"Cisco: Data center: Load balancing data center services", Retrieved at <<http://www.cisco.com/en/US/solutions/collateral/ns340/ns517/ns224/ns668/>>, Mar. 2004, pp. 94.

"Cisco. UniDirectional Link Detection (UDLD)", Retrieved at <<http://www.cisco.com/en/US/tech/tk866/tsd_technology_support_sub-protocol_home.html>>, pp. 2.

"EMC Ionix Application Discovery Manager", Retrieved at <<http://www.emc.com/collateral/software/data-sheet/h2365-ionix-adm-ds.pdf>>, Proceedings of ICIDS 2008, Retrieved Date: Oct. 19, 2011, pp. 5.

Ford, et al., "Availability in globally distributed storage systems", Retrieved at <<http://www.usenix.org/event/osdi10/tech/full_papers/Ford.pdf>>, Proceedings of OSDI, 2010, pp. 1-14.

Greenberg, et al., "Towards a Next Generation Data Center Architecture: Scalability and Commoditization", Retrieved at <<http://research.microsoft.com/pubs/79348/presto27-greenberg.pdf>>, Proceedings of the ACM Workshop on Programmable Routers for Extensible Services of Tomorrow, Aug. 22, 2008, pp. 57-62.

Guo, et al., "DCell: A Scalable and Fault-Tolerant Network Structure for Data Centers", Retrieved at <<http://research.microsoft.com/pubs/75988/dcell.pdf>>, In Proceedings of the ACM SIGCOMM Conference on Data Communication, Aug. 17, 2008, pp. 75-86.

Gyarmati, et al., "Scafida: A Scale-Free Network Inspired Data Center Architecture", Retrieved at <<http://ccr.sigcomm.org/drupal/files/p5-2v40n5b2-gyarmatiPS.pdf>>, In ACM SIGCOMM Computer Communication Review, vol. 40, Issue 5, Oct. 2010, pp. 4-12.

Kim, et al., "Floodless in SEATTLE: A scalable ethernet architecture for large enterprises", Retrieved at <<http://www.cs.princeton.edu/courses/archive/fall10/cos561/papers/Seattle08.pdf>>, Proceedings of SIGCOMM, 2008, Aug. 17-22, 2008, pp. 12.

McKeown, et al., "Openflow: enabling innovation in campus networks", Retrieved at <<http://www.cs.illinois.edu/~pbg/courses/cs598fa10/readings/mabpprst08.pdf>>, Proceedings of SIGCOMM CCR, Mar. 14, 2008, pp. 6.

Meykar, O.; "Definitions of Effectiveness Terms: A Report on the Purpose and Contents of MIL-STD-721B"; IEEE Transactions on Aerospace and Electronic Systems; vol. AES3, No. 2; Mar. 1967; pp. 165-170.

MIL-STD-721C; Jun. 12, 1981; Department of Defense, Washington, D.C.; 18 pages.

O'Connor, P et al.; "Practical Reliability Engineering"; Wiley & Sons; 2012, pp. 1, 147 and 431.

Schroeder, et al., "Disk failures in the real world: What does an MTTF of 1,000,000 hours mean to you?", Retrieved at <<http://www.usenix.org/event/fast07/tech/schroeder/schroeder.pdf>>, Proceedings of FAST '07: 5th USENIX Conference on File and Storage Technologies, pp. 1-16.

Schroeder, et al., "Dram errors in the wild: A large-scale field study", Retrieved at <<http://edpin.com/dram_sigmetrics09.pdf>>, Proceedings of SIGMETRICS, 2009., Jun. 15-19, 2009, pp. 12.

"Security Information & Event Manager (SIEM)", Retrieved at <<http://www.enterasys.com/company/literature/siem-ds.pdf>>, Retrieved Date: Oct. 19, 2011, pp. 7.

Singh, et al., "DYSWIS: An Architecture for Automated Diagnosis of Networks", Retrieved at <<http://www.cs.columbia.edu/~vs2140/DYSWIS.pdf>>, May 1-10, 2011, pp. 8.

"Spanning Tree Protocol Root Guard Enhancement", Retrieved at <<http://www.cisco.com/application/pdf/paws/10588/74.pdf>>, Retrieved Date: Feb. 15, 2012, pp. 6.

Tang, D. et al.; "Analysis and Modeling of Correlated Failures in Multicomputer Systems"; IEEE Transactions on Computers; vol. 41, No. 5; May 1992; 11 pages.

Thottan, et al., "Anomaly Detection in IP Networks", Retrieved at <<http://users.ece.gatech.edu/jic/sig03.pdf>>, Proceedings of IEEE Transactions on Signal Processing, vol. 51, No. 8, Aug. 2003, pp. 2191-2204.

Vishwanath, et al., "Characterizing cloud computing hardware reliability", Retrieved at <<http://research.microsoft.com/pubs/120439/socc088-vishwanath.pdf>>, Proceedings of Symposium on Cloud Computing (SOCC), 2010, Jun. 10-11, 2010, pp. 11.

Wang, et al., "MCube A High Performance and Fault-Tolerant Network Architecture for Data Centers", Retrieved at <<http://ieeexplore.ieee.org/stamp/stamp.jsp?tp=&arnumber=5540940>>, 2010 International Conference on Computer Design and Applications, Jun. 25, 2010, pp. 423-427.

"Method and System for Determining the Impact of Failures in Data Center Networks", U.S. Appl. No. 13/409,111, filed Mar. 1, 2012, pp. 33.

"Microsoft Assessment and Planning Toolkit," Retrieved at <<http://www.microsoft.com/sam/en/us/map.aspx>> Sep. 23, 2010.

Cisco Systems Inc., "Network Management System," White Paper on Network Management Best System Practices, Aug. 9, 2003.

"International Search Report and Written Opinion," Application No. PCT/US2013/070188, Mailed Date: May 22, 2014.

Song et al., "Availability Modeling and Analysis on High Performance Cluster Computing Systems", Proceedings of the First IEEE International Conference on Availability, Reliability, and Security, pp. 305-313, Apr. 20, 2006.

"Response to International Search Report and Written Opinion: Article 34 Demand," From PCT Application No. PCT/US2013/070188, filed Sep. 5, 2014.

"Written Opinion of the International Preliminary Examination Authority," From PCT Application No. PCT/U52013/070188, Mailed: Oct. 29, 2014.

"Second Written Opinion" from PCT/US2013/070188, Mailed Oct. 29, 2014, 6 pages.

"Response to Second Written Opinion" from PCT/US2013/070188, filed Nov. 21, 2014, 8 pages.

"Non-Final Office Action," From U.S. Appl. No. 13/409,111, filed Mar. 1, 2012, Mailed: Jan. 16, 2014.

"Response to the Jan. 16, 2014 Non-Final Office Action," From U.S. Appl. No. 13/409,111, filed Apr. 11, 2014.

"Final Office Action," From U.S. Appl. No. 13/409,111, Mailed: Jun. 2, 2014.

"Response to the Jun. 2, 2014 Final Office Action," From U.S. Appl. No. 13/409,111, filed Sep. 2, 2014.

"Non-Final Office Action," From U.S. Appl. No. 13/409,111, Mailed: Sep. 12, 2014.

"Second Written Opinion from the International Preliminary Examining Authority" from PCT/US2013/070327, Mailed Oct. 29, 2014, 11 pages.

Manning et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, pp. 504.

Marcus et al., "Building a Large Annotated Corpus of English: The Penn Treebank", Retrieved at <<http://delivery.acm.org/10.1145/980000/972475/p313-marcus.pdf>>, In Journal of Computational Linguistics—Special Issue on Using Large Corpora, vol. 19, Issue 2, Jun. 1993, pp. 18.

McCallum et al., "Early Results for Named Entity Recognition with Conditional Random Fields, Feature Induction and Web-Enhanced Lexicons", Retrieved at <<http://people.cs.umass.edu/~mccallum/papers/mccallum-conll2003.pdf>>, In Proceedings of the Seventh Conference on Natural language learning at HLT-NAACL, vol. 4, May 31, 2003, pp. 4.

Medem et al., "TroubleMiner: Mining Network Trouble Tickets", Retrieved at <<http://ieeexplore.ieee.org/stamp/stamp.jsp?tp=&arnumber=5195946>>, In IFIP/IEEE International Symposium on Integrated Network Management-Workshops, Jun. 1, 2009, pp. 7.

Melchiors et al., "Troubleshooting Network Faults Using Past Experience", Retrieved at <<http://ieeexplore.ieee.org/stamp/stamp.jsp?arnumber=00830413>>, In IEEE/IFIP Network Operations and Management Symposium, Apr. 10, 2000, pp. 14.

"SQL Server", Retrieved at <<http://www.microsoft.com/sqlserver/en/us/default.aspx>>, Aug. 8, 2012, pp. 12.

Huang et al., "Diagnosing Network Disruptions with Network-Wide Analysis", Retrieved at <<http://www.cc.gatech.edu/~jx/reprints/metrics160.pdf>>, In Proceedings of the ACM SIGMETRICS International Conference on Measurement and Modeling of Computer Systems, Jun. 12, 2007, pp. 12.

(56) References Cited

OTHER PUBLICATIONS

Kandula et al., "What's Going On? Learning Communication Rules In Edge Networks", Retrieved at <<http://citeseerx.ist.psu.edu/viewdoc/download?doi=10.1.1.145.3918&rep=rep1&type=pdf>>, In Proceedings of the ACM SIGCOMM Conference on Data Communication, Aug. 17, 2008, pp. 12.

Loper et al., "NLTK: The Natural Language Toolkit", Retrieved at <<http://arxiv.org/pdf/cs/0205028v1.pdf>>, In Proceedings of the Workshop on Effective Tools and Methodologies for Teaching Natural Language Processing and Computational Linguistics, May 17, 2002, pp. 8.

Manber et al., "Suffix arrays: A New Method for on-Line String Searches", Retrieved at <<http://webglimpse.net/pubs/suffix.pdf>>, In Proceedings of the First Annual ACM-SIAM Symposium on Discrete Algorithms, Jan. 22, 1990, pp. 16.

Mitra et al., "Automatic Text Summarization by Paragraph Extraction", Retrieved at <<http://www.aclweb.org/anthology-new/W/W97/W97-0707.pdf>>, In Proceedings of the Workshop on Intelligent Scalable Summarization at the ACL/EACL Conference, Jul. 7, 1997, pp. 8.

Nagao et al., "A New Method of N-Gram Statistics for Large Number of N and Automatic Extraction of Words and Phrases from Large Text Data of Japanese", Retrieved at <<http://delivery.acm.org/10.1145/1000000/991994/p611-nagao.pdf>>, In COLING '94 Proceedings of the 15th Conference on Computational linguistics, vol. 1, Aug. 5, 1994, pp. 5.

Noy et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, pp. 25.

Paolacci et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, pp. 9.

Qiu et al., "What Happened in My Network? Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, pp. 13.

Raghavendra et al., "No Power Struggles: Coordinated Multi-level Power Management for the Data Center", Retrieved at <<http://www.cs.pitt.edu/~kirk/cs3150spring2010/2008_asplos_nopowerstruggles.pdf>>, In ACM SIGOPS Operating Systems Review, vol. 42, Issue 2, Mar. 1, 2008, pp. 12.

Seemakurty et al., "Word Sense Disambiguation via Human Computation", Retrieved at http://www.cs.cmu.edu/~tomasic/doc/2010/SeemakurtyEtAIHCOMP2010.pdf, In Proceedings of the ACM SIGKDD Workshop on Human Computation, Jul. 25, 2010, pp. 4.

Roughan et al., "IP Forwarding Anomalies and Improving their Detection Using Multiple Data Sources", Retrieved at <<http://citeseerx.ist.psu.edu/viewdoc/download?doi=10.1.1.1.5316&rep=rep1&type=pdf>>, In Proceedings of the ACM SIGCOMM Workshop on Network Troubleshooting, Aug. 30, 2004, pp. 6.

Sorokin et al., "Utility Data Annotation with Amazon Mechanical Turk", Retrieved at <<http://ieeexplore.ieee.org/stamp/stamp.jsp?tp=&arnumber=4562953>>, In IEEE Computer Society Conference on Computer Vision and Pattern Recognition Workshops, Jun. 23, 2008, pp. 8.

Toutanova et al., "Enriching the Knowledge Sources Used in a Maximum Entropy Part-of-Speech Tagger", Retrieved at <<http://nlp.stanford.edu/~manning/papers/emnlp2000.pdf, In Proceedings of the Joint SIGDAT Conference on Empirical Methods in Natural Language Processing and Very Large Corpora, Oct. 7, 2000, pp. 8.

Ukkonen, Esko., "On-Line Construction of Suffix Trees", Retrieved at <<http://www.cs.helsinki.fi/u/ukkonen/SuffixT1withFigs.pdf>>, In Journal of Algorithmica, Sep. 1995, pp. 18.

Ahn, Luis Von., "Games with a Purpose", Retrieved at <<http://www.cs.cmu.edu/~biglou/ieee-gwap.pdf>>, In Computer, Volume, Jun. 2006, pp. 3.

Ahn et al., "Labeling Images with a Computer Game", Retrieved at <<http://www.cs.cmu.edu/~biglou/ESP.pdf>>, In Proceedings of the SIGCHI Conference on Human Factors in Computing Systems, Apr. 24, 2004, pp. 8.

Welch, Terry A., "A Technique for High-Performance Data Compression", Retrieved at <<http://ieeexplore.ieee.org/stamp/stamp.jsp?tp=&arnumber=1659158, In Computer, vol. 17, Issue 6, Jun. 1984, pp. 12.

Wu et al., "Open Information Extraction Using Wikipedia", Retrieved at <<http://www.cs.washington.edu/homes/weld/papers/wu-acl10.pdf>>, In Proceedings of the 48th Annual Meeting of the Association for Computational Linguistics, Jul. 11, 2010, pp. 10.

Yamamoto et al., "Using Suffix Arrays to Compute Term Frequency and Document Frequency for All Substrings in a Corpus", Retrieved at <<http://acl.ldc.upenn.edu/J/J01/J01-1001.pdf>>, In Journal of Computational Linguistics, vol. 27, Issue 1, Mar. 2001, pp. 30.

Yuan et al., "SherLog: Error Diagnosis by Connecting Clues from Run-time Logs", Retrieved at <<http://opera.ucsd.edu/paper/asplos10-sherlog.pdf>>, In Newsletter of ACM SIGARCH Computer Architecture News, vol. 38, Issue 1, Mar. 2010, pp. 12.

Zhang et al., "Extraction of Chinese Compound Words—An Experimental Study on a Very Large Corpus", Retrieved at <<http://acl.ldc.upenn.edu/W/W00/W00-1219.pdf>>, In Proceedings of the Second Workshop on Chinese language Processing, Oct. 2000, pp. 8.

Xu et al., "Detecting Large-Scale System Problems by Mining Console Logs", Retrieved at <<http://www.sigops.org/sosp/sosp09/papers/xu-sosp09.pdf>>, In Proceedings of the ACM SIGOPS 22nd Symposium on Operating Systems Principles, Oct. 11, 2009, pp. 16.

Barco, et al., "Automated Troubleshooting of Mobile Networks Using Bayesian Networks", Retrieved at <<http://www.lcc.uma.es/~eva/doc/materiales/barco.pdf>>, Proceedings of the IASTED International Conference Communication Systems and Networks, Sep. 9, 2002, pp. 6.

Yamanishi et al., "Dynamic Syslog Mining for Network Failure Monitoring", Retrieved at <<http://citeseerx.ist.psu.edu/viewdoc/download?doi=10.1.1.96.8083&rep=rep1&type=pdf>>, In Proceedings of the Eleventh ACM SIGKDD International Conference on Knowledge Discovery in Data Mining, Aug. 21, 2005, pp. 10.

Notice of Allowance Mailed May 29, 2015 from U.S. Appl. No. 13/535,366, 9 pages.

Ahonen et al., "Applying Data Mining Techniques for Descriptive Phrase Extraction in Digital Document Collections," 1998, IEEE, Proceedings of ADL '98, Apr. 22-24, pp. 1-10.

Response Filed Apr. 30, 2015 to Final Office Action mailed Feb. 12, 2015 from U.S. Appl. No. 13/535,366, 13 pages.

Final Office Action mailed Feb. 12, 2015 from U.S. Appl. No. 13/535,366, 13 pages.

Response Filed Dec. 1, 2014 to Non-Final Office Action mailed Sep. 24, 2014 from U.S. Appl. No. 13/535,366, 13 pages.

Non-Final Office Action mailed Sep. 24, 2014 from U.S. Appl. No. 13/535,366, 16 pages.

Smadja, Frank, "Retrieving Collocations from Text: Xtract," Retrieved at <<http://acl.ldc.upenn.edu/J/J93/J93-1007.pdf>>, In Journal of Computational Linguistics, vol. 19, No. 1, Mar. 1993, pp. 143-177.

C. E. Brown, "Coefficient of Variation," in AMSGRS, 1998, pp. 55-157.

Bos, B, et al.; "Cascading style sheets, level 2 revision 1 CSS 2.1 specification"; W3C working draft; W3C; Jun. 2005; 220 pages.

Fruchterman, T. et al.; "Graph drawing by force-directed placement"; Software: Practice and Experience; vol. 21, No. 1 1; Nov. 1991; pp. 1129-1164.

Gruschke, B.; "Integrated event management: Event Correlation Using Dependency Graphs"; Proceedings of the 9th IFIP/IEEE International Workshop on Distributed Systems: Operations & Management (DSOM 98); 1998; 12 pages.

Heim, I.; "Anaphora and Semantic Interpretation: A Reinterpretation of Reinhart's Approach"; MIT Working Papers in Linguistics 25; 1998; pp. 205-246.

Justeson, J. et al.; "Technical terminology: some linguistic properties and an algorithm for identification in text"; Natural Language Engineering; vol. 1, No. 1; 1995; pp. 9-27.

(56) References Cited

OTHER PUBLICATIONS

"N-Gram Extraction Tools"; retrieved at http://goo.gl/VNTJa; accessed on Oct. 31, 2012; 3 pages.
Ziefle, M.; "Effects of display resolution on visual performance"; Human Factors: The Journal of the Human Factors and Ergonomics Society; vol. 40, No. 4; 1998; pp. 554-568.
"Jquery", Retrieved at <<http://jquery.com/>>, Retrieved Date: Aug. 7, 2012, p. 1.
Muehlen, et al., "Developing Web Services Choreography Standards Ł The Case of REST vs. SOAP.", Retrieved at <<http://citeseerx.ist.psu.edu/viewdoc/download?doi=10.1.1.80.6494&rep=rep1&type=pdf>>, In Journal of Decision Support Systems—Special Issue, Jul. 2005, pp. 35.
Manning, et al., "Foundations of Statistical Natural Language Processing", Retrieved at <<http://cs.famaf.unc.edu.ar/~laura/llibres/snlp.pdf>>, In Book of Foundations of Statistical Natural Language Processing, Jun. 18, 1999, pp. 704.
Aguilera, et al., "Performance Debugging for Distributed Systems of Black Boxes", Retrieved at <<http://pdos.csail.mit.edu/~athicha/papers/blackboxes:sosp03.pdf>>, In Proceedings of the Nineteenth ACM Symposium on Operating Systems Principles, Oct. 19, 2003, pp. 16.
Aho, et al., "Efficient String Matching: An Aid to Bibliographic Search", Retrieved at <<http://cisc-w09.isrl.kr/cgi-bin/TUBoard/db/seminar/upload/1183356194165246034173/p333-aho-corasick.pdf>>, In Communications of the ACM, vol. 18, No. 6, Jun. 1975, pp. 8.
Barnes, et al., "A Hierarchical O (N log N) Force-calculation Algorithm",Retrieved at <<http://www.ecs.umass.edu/~mettu/ece665/barnes_86.pdf, In Letters to Nature, vol. 324, Issue 4, Dec. 1986, pp. 4.
Bostock, et al., "D3: Data-Driven Documents.",Retrieved at <<http://vis.stanford.edu/files/2011-D3-InfoVis.pdf>>, In IEEE Transactions on Visualization and Computer Graphics, vol. 17, No. 12, Jan. 2011, pp. 9.
Brauckhoff, et al., "Anomaly Extraction in Backbone Networks using Association Rules", Retrieved at <<http://www.csg.ethz.ch/people/dimitroc/papers/imc09.pdf>>, In Proceedings of the 9th ACM SIGCOMM Conference on Internet Measurement Conference, Nov. 4, 2009, pp. 7.
Bray, et al., "Extensible Markup Language (XML)", Retrieved at <<http://www.w3.org/TR/PR-xml-971208>>, In Journal of World Wide Web Consortium, Dec. 8, 1997, pp. 7.
Church, et al., "Word Association Norms, Mutual Information, and Lexicography", Retrieved at <<http://acl.ldc.upenn.edu/J/J90/J90-1003.pdf>>, In Journal of Computational Linguistics, vol. 16, No. 1, Mar. 1990, pp. 8.
Cohen, et al., "Capturing, Indexing, Clustering, and Retrieving System History", Retrieved at <<http://www.research.rutgers.edu/~lekien/papers/Cohen_etalSOSP2005.pdf>>, In Proceedings of the Twentieth ACM Symposium on Operating systems Principles, Oct. 23, 2005, pp. 14.
Cooley, et al., "Web Mining: Information and Pattern Discovery on the World Wide Web", Retrieved at <<http://ieeexplore.ieee.org/stamp/stamp.jsp?tp=&arnumber=632303>>, In Proceedings of the Ninth IEEE International Conference on Tools with Artificial Intelligence, Nov. 3, 1997, pp. 10.
Fielding, Roy Thomas., "Architectural Styles and the Design of Network-based Software Architectures", Retrieved at <<http://jpkc.fudan.edu.cn/picture/article/216/35/4b/22598d594e3d93239700ce79bce1/7ed3ec2a-03c2-49cb-8bf8-5a90ea42f523.pdf>>, In Doctoral Dissertation Architectural Styles and the Design of Network-based Software Architectures, Aug. 8, 2012, pp. 180.
Garrett, Jesse James., "Ajax: A New Approach to Web Applications", Retrieved at <<http://scholar.googleusercontent.com/scholar?q=cache:DY1KmbMV5IMJ:scholar.google.com/+Ajax:+A+new+approach+to+web+applications&hl=en&as_sdt=0,5>>, Feb. 18, 2005, pp. 14.
Goldstein, et al., "Summarizing Text Documents: Sentence Selection and Evaluation Metrics", Retrieved at <<http://www.cs.cmu.edu/afs/cs.cmu.edu/Web/People/jgc/publication/Summarizing_Text_Documents_Sentence_SIGIR_1999.pdf>>, In Proceedings of the 22nd Annual International ACM SIGIR Conference on Research and Development in Information Retrieval, Aug. 15, 1999, pp. 8.
Gruber, Thomas R., "Toward Principles for the Design of Ontologies Used for Knowledge Sharing", Retrieved at <<http://www.civ.utoronto.ca/sect/coneng/i2c/Civ1283/Civ1283-Ref-Final/Civ1283-Advanced%20Ref/Ontology/Gruber%20paper.pdf>>, In International Journal of Human-Computer Studies—Special Issue, Nov. 1995, pp. 22.
"HTML5: A Vocabulary and Associated APIs for HTML and XHTML.", Retrieved at <<http://www.w3.org/TR/2010/WD-html5-20100624/>>, Aug. 7, 2012, pp. 23.
Deerwester, et al., "Indexing by Latent Semantic Analysis", Retrieved at <<http://www.cob.unt.edu/itds/faculty/evangelopoulos/dsci5910/LSA_Deerwester1990.pdf>>, In Journal of the American Society for Information Science, vol. 41, Issue 6, Sep. 1990, pp. 17.
Khanna, et al., "Automated Rule-Based Diagnosis through a Distributed Monitor System", Retrieved at <<http://ieeexplore.ieee.org/stamp/stamp.jsp?tp=&arnumber=4358702>>, In IEEE Transactions on Dependable and Secure Computing, vol. 4, Issue 4, Oct. 2007, pp. 266-279.
Konig, et al., "Reducing the Human Overhead in Text Categorization", Retrieved at <<http://research.microsoft.com/pubs/68150/rtpp139-konig.pdf>>, In Proceedings of the 12th ACM SIGKDD International Conference on Knowledge Discovery and Data Mining, Aug. 20, 2006, pp. 6.
Lim, et al., "A Log Mining Approach to Failure Analysis of Enterprise Telephony Systems", Retrieved at <<http://ieeexplore.ieee.org/stamp/stamp.jsp?arnumber=04630109>>, In IEEE International Conference on Dependable Systems and Networks with FTCS and DCC, Jun. 24, 2008, pp. 6.
Mackay, David J.C., "Information Theory, Inference, and Learning Algorithms", Retrieved at <<http://www.cs.toronto.edu/~mackay/itprnn/book.pdf>>, In Book of Information Theory, Inference & Learning Algorithms, Oct. 6, 2003, pp. 640.
Mani, et al., "The Tipster Summac Text Summarization Evaluation", Retrieved at http://acl.ldc.upenn.edu/E/E99/E99-1011.pdf>>, In Proceedings of the Ninth Conference on European Chapter of the Association for Computational Linguistics, Jun. 8, 1999, pp. 9.
"Response to International Search Report & Written Opinion dated Mar. 28, 2014," from PCT Patent Application No. PCT/US2013/070327, Filed Sep. 5, 2014, 9 pages.
"International Preliminary Report on Patentability," from PCT Patent Application No. PCT/US2013/070327, Mailed Date: Feb. 19, 2015, 12 pages.
"Notice of Allowance" Mailed Feb. 13, 2014, From U.S Appl. No. 13/409,111, 8 pages.
"Response to Non-Final Office Action" Mailed Sep. 12, 2014 filed Dec. 11, 3014 from U.S. Appl. No. 13/409,111, 11 pages.
"Demystifying the Dark Side of the Middle: A Field Study of Middlebox Failures in Datacerners", Rahul Ptharaju and Navendu Jain, IMC '13, Oct. 23-25, 2013, Barcelona, Span. ACM 2013. 14 Pages.
Sherry et al., "Making Middleboxes Someone Else's Problem: Network Processing As a Cloud Service," in SIGCOMM, Sep. 24, 2012. 12 Pages.
"Why Gmail went down: Google misconfigured load balancing servers," Online Retrieved From Why Gmail went down: Google misconfigured load balancing servers (Updated). Dec. 11, 2012. 4 Pages.
Sekar et al., "Design and Implementation of a Consolidated Middlebox Architecture," in NSDI, Apr. 25-27, 2012. 14 Pages.
Uppal et al., "ETTM: A Scalable Fault Tolerant NetworkManager," in NSDI, Mar. 30-Apr. 1, 2011. 14 Pages.
Greenhalgh et al., "Flow Processing and the Rise of Commodity Network Hardware," ACM SIGCOMM Computer Communication Review, vol. 39, No. 2, Apr. 2009. 7 Pages.
Liu et al., "F10: Fault-Tolerant Engineered Networks," USENIX Association 10th USENIX Symposium on Networked Systems Design and Implementation, NSDI, Apr. 3-5, 2013. 14 Pages.

(56) References Cited

OTHER PUBLICATIONS

Wang ta I., "An Untold Story of Middleboxes in Cellular Networks," SIGCOMM'11, Aug. 15-19, 2011, Toronto, Ontario, Canada. 13 Pages.

Mann et al., "On a Test of Whether One of Two Random Variables is Stochastically Larger than the Other," in The Annals of Mathematical Statistics, vol. 18, No. 1, Mar. 1947. 11 Pages.

Potharaju et al., "Juggling the Jigsaw: Towards Automated Problem Inference from Network Trouble Tickets," in 10th USENIX Symposium on Networked Systems Design and Implementation, NSDI, Apr. 3-5, 2013. 15 Pages.

C. E. Brown, "Coefficient of Variation," in Applied Multivariate Statistics in Geohydrology and Related Sciences 1998. pp. 155-157.

Mahimkar et al., "dFence: Transparent network-based denial of service mitigation," 4th USENIX Symposium on Networked Systems Design & Implementation, Apr. 11-13, 2007. 25 Pages.

R. Sakia, "The Box-Cox Transformation Technique: A Review," in The Statistician, Journal of the Royal Statistical Society, Series D, vol. 41, No. 2, 1992. 6 Pages.

T. L. Bailey and C. Elkan, "Fitting a Mixture Model by Expectation Maximization to Discover Motifs in Bipolymers," in ISMB, Aug. 1994. 33 Pages.

H. W. Lilliefors, "On the Kolmogorov-Smirnov Test for Normality with Mean and Variance Unknown," JASA, Jun. 1967. 5 Pages.

Argyraki et al., "Can Software Routers Scale?" in PRESTO'08, Aug. 22, 2008, Seattle, Washington, USA. 6 Pages.

Nedevschi et al., "Reducing Network Energy Consumption via Sleeping and Rate-adaptation," in NSDI '08: 5th USENIX Symposium on Networked Systems Design USENIX Association and Implementation, Aug. 11, 2008. 14 Pages.

Kazemian et al., "Header space analysis: Static checking for networks," in NSDI, Apr. 25, 2012. 14 Pages.

Handigol et al., Where is the debugger for my software-defined network? in Proceedings of the first workshop on Hot topics in software defined networks. HotSDN'12, Aug. 13, 2012, Helsinki, Finland. 6 Pages.

Mai et al., "Debugging the Data Plane with Anteater," SIGCOMM'11, Aug. 15-19, 2011, Toronto, Ontario, Canada. 12 Pages.

Feamster et al., "Detecting BGP configuration Faults with Static Analysis," 2nd Symp. on Networked Systems Design and Implementation (NSDI), Boston, MA, May 2005.

Feldmann et al., "IP network Configuration for Intra-domain Traffic Engineering," Network, IEEE, Sep./Oct. 2001. 27 Pages.

Hancock et al., "Next steps in signaling (NSIS): Framework," in IETF RFC 4080, Jun. 2005. 46 Pages.

L. Ellram, "Total Cost of Ownership: An Analysis Approach for Purchasing," in Journal of PDLM, 1995. 12 Pages.

Leland et al., "On the Self-Similar Nature of Ethernet Traffic (extended version)," in IEEE ToN, Feb. 1994. 15 Pages.

T. K. Moon, "The Expectation-Maximization Algorithm," Nov. 1996. 14 Pages.

Bendel et al., "Comparison of Skewness Coefficient, Coefficient of Variation, and GiniCoefficient as Inequality Measures within Populations," in Oecologia, vol. 78, Issue 3, Mar. 1989. 7 Pages.

"2011 ADC Security Survey Global Findings," http://www.slideshare.net/f5dotcom/2011-f5-adc-security-survey-global-slideshare. Nov. 4, 2011. 10 Pages.

M. Scharf and A. Ford, "MP-TCP Application Interface Considerations," draft-ietf-mptcp-api-00, Nov. 29, 2010. 10 Pages.

"Cisco Data Center Network Architecture," http://www.cisco.com/c/dam/en/us/solutions/collateral/data-center-virtualization/net_brochure0900aecd80404988.pdf, 2006. 2 Pages.

Office Action Mailed Feb. 4, 2015 from U.S. Appl. No. 13/677,302.

Response to Office Action Filed May 4, 2015 from U.S. Appl. No. 13/677,302.

PCT Written Opinion Mailed Oct. 29, 2014 From PCT/US2013/070327. 11 Pages.

Law et al., "An Integrated Case-Based Reasoning Approach for Intelligent Help Desk Fault Management", 1997, Expert Systems with Applications, vol. 13, No. 4, pp. 265-274.

Spasic et al., "Text Mining and Ontologies in Biomedicine: Making Sense of Raw Text", Sep. 2005, Briefings in Bioinformatics, vol. 6, No. 3, pp. 239-251.

Behnel, S. et al.; "Cython: C-Extensions for Python"; retrieved at http://cython.org; published 2008; accessed Oct. 31, 2012; 3 pages.

"International Search Report" from Application No. PCT/US2013/070327 Mailed May 15, 2014.

"Attensity Text Analytics Software", Attensity White Paper, retrieved on Apr. 15, 2015, 14 pages.

"Enterprise Feedback Management", Published on: Jun. 30, 2012, retrieved at <<http://www.forumresearch.com/services-enterprise-feedback-management.asp>>, 2 pages.

Aciar, Silvana, "Mining Context Information from Consumer's Reviews", Proceedings of 2nd Workshop on Context-Aware Recommender Systems, Sep. 30, 2010, 5 pages.

Baysal, et al., "A Bug You Like: A Framework for Automated Assignment of Bugs", IEEE 17th International Conference on Program Comprehension, May 17, 2013, 2 pages.

Benson, M., "Collocations and General-Purpose Dictionaries," International Journal of Lexicography, 1990, 12 pages.

Bettenburg, et al., "Duplicate Bug Reports Considered Harmful Really?", IEEE International Conference on Software Maintenance, 2008, 9 pages.

Bettenburg, et al., "Extracting Structural Information from Bug Reports," ACM International Working Conference on Mining Software Repositories, 2008, 4 pages.

Bhattacharya, et al., "Automated, Highly-Accurate, Bug Assignment Using Machine Learning and Tossing Graphs", Journal of Systems and Software, vol. 85, Issue 10, Oct. 2012, 18 pages.

Brugnoni, et al., "An Expert system for Real Time Fault Diagnosis of the Italian Telecommunications Network," International Symposium on Integrated Network Management, 1993, 13 pages.

Goryachev, et al., "Implementation and Evaluation of Four Different Methods of Negation Detection," Tech. Rep., DSG, 2006, 7 pages.

Goyal, et al., "Streaming for Large Scale NLP: Language Modeling," Annual Conference of the Association for Computational Linguistics, 2009, 9 pages.

Heafield, K., "Kenlm: Faster and Smaller Language Model Queries," Workshop on Statistical Machine Translation, 2011, 11 pages.

Hooimeijer, et al., "Modeling Bug Report Quality," IEEE/ACM International Conference on Automated Software Engineering, 2007, 10 pages.

Jonsson, et al., "Automated Bug Assignment: Ensemble-based Machine Learning in Large Scale Industrial Contexts", Proceedings of Empirical Software Engineering, retrieved on Apr. 29, 2015, 52 pages.

Just, et al., "Towards the Next Generation of Bug Tracking Systems," IEEE Symposium on Visual Languages and Human-entric Computing, 2008, 4 pages.

Kittur, et al., "Crowdsourcing User Studies with Mechanical Turk," ACM SIGCHI Conference on Human Factors in Computing Systems, 2008, 4 pages.

Lang, et al., "Enhancing Business Intelligence with Unstructured Data", Proceedings of Conference on Database Systems in Business, Technology and Web, Mar. 2, 2009, pp. 469-485, 17 pages.

Runeson, P., et al., "Detection of Duplicate Defect Reports Using Natural Language Processing," IEEE International Conference on Software Engineering, 2007, 10 pages.

CodePlex, Project Hosting for Open Source Software, "SharpNPL—Open Source Natural Language Processing Tools", retrieved at https://web.archive.org/web/20120623043531/http://sharpnlp.codeplex.com/, Dec. 13, 2006, 2 pages.

Shokripour, et al., "Automatic Bug Assignment Using Information Extraction Methods", In Proceedings of International Conference on Advanced Computer Science Applications and Technologies, Nov. 26, 2012, 6 pages.

Simm, et al., "Classification of Short Text Comments by Sentiment and Actionability for VoiceYourView", In Proceedings of IEEE Inter-

(56) References Cited

OTHER PUBLICATIONS national Conference on Social Computing/IEEE International Conference on Privacy, Security, Risk and Trust, Aug. 20, 2010, pp. 552-557, 6 pages.
Sukumaran, et al., "Integrating Structured and Unstructured Data Using Text Tagging and Annotation", In the Data Administration Newsletter, May 29, 2007, 6 pages.
Weight, "Allegiance: How Text Analytics Changes Everything", Retrieved on Apr. 15, 2015, at <<https://www.allegiance.com/documents/text_analytics.pdf>>, 6 pages.
Wu et al., "NetPilot: Automating Datacenter Network Failure Mitigation", Annual Conference of the ACM Special Interest Group on Data Communication, Aug. 13, 2012, 12 pages.
Mysore et al., "PortLand: A Scalable Fault-Tolerant Layer 2 Data Center Network Fabric", Proceedings of the ACM SIGCOMM 2009 Conference on Data Communication, vol. 39, Issue 4, Oct. 2009, pp. 39-50, 12 pages.
Notice of Allowance mailed Aug. 5, 2015 from U.S. Appl. No. 13/677,302, 15 pages.
Notice of Allowance mailed Feb. 13, 2015 from U.S. Appl. No. 13/409,111, 8 pages.
Non-Final Office Action mailed Jul. 17, 2015 from U.S. Appl. No. 13/861,857, 16 pages.
Notice of Allowance mailed Jun. 19, 2015 from U.S. Appl. No. 13/924,452, 8 pages.
Notice of Allowance mailed Sep. 14, 2015 from U.S. Appl. No. 13/924,452, 7 pages.
Response filed Sep. 22, 2015 to Non-Final Office Action mailed Jul. 17, 2015 from U.S. Appl. No. 13/861,857, 11 pages.
Notice of Allowance mailed Oct. 6, 2015 from U.S. Appl. No. 13/535,366, 6 pages.
Ellram et al., "Total Cost of Ownership A Key Concept in Strategic Cost Management Decisions", Journal of Business Logistics, vol. 19, No. 1, 1998, pp. 55-84, 28 pages.
Voluntary Amendments filed Nov. 13, 2015 from China Patent Application No. 201380059928.0, 12 pages.
Supplemental Notice of Allowability Mailed Nov. 19, 2015 From U.S. Appl. No. 13/535,366, 3 Pages.
Final Office Action Mailed Dec. 1, 2015 From U.S. Appl. No. 13/861,857, 23 Pages.
Notice of Intention to Grant Mailed Nov. 24, 2015 From European Patent Application No. 13802771.9, 53 Pages.
Supplemental Notice of Allowability mailed Dec. 9, 2015 from U.S. Appl. No. 13/535,366, 3 pages.

\* cited by examiner

MIDDLEBOX RELIABILITY

BACKGROUND

Datacenters deploy a variety of intermediary devices or middleboxes, such as load balancers, firewalls, intrusion detection and prevention systems (IDPS), and virtual private networks (VPNs). These devices provide broad range functionalities to secure, manage, and improve the performance of hosted services as well as support new traffic classes and applications. Even in enterprise networks, the number of middleboxes is becoming comparable to the number of routers. The middleboxes constitute a significant fraction of the network capital costs and operational expenses, e.g., human experts to manage them.

SUMMARY

The patent relates to middlebox reliability One example can apply event filters to a dataset of middlebox error reports to separate redundant middlebox error reports from a remainder of the middlebox error reports of the dataset. The example can categorize the remainder of the middlebox error reports of the dataset by middlebox device type. The example can also generate a graphical user interface that conveys past reliability and predicted future reliability for an individual model of an individual middlebox device type.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This discussion relates to understanding middlebox reliability. The information from the present techniques can relate to reliability of different types of middleboxes, such as failures (e.g., failure events) caused by load balancers compared to failures caused by firewalls. Further, this information can relate to models of devices within a specific type of middlebox. For instance, the techniques can provide the relative failure rate of a "model a" load balancer versus a "model b" load balancer. Further still, these techniques can predict a useful lifespan of a particular model, such that replacement plans can be considered in advance as well as cost vs. benefit decision-making for spare inventory management. As used herein, the term reliability can be defined as the probability that an item will perform its intended function without failure for a specified interval under stated conditions. Failure can be defined as the inability of an item to function within its specified limits of performance.

Some of the present techniques can leverage datacenter middlebox error reports (hereinafter, "error reports"). Error reports relate to failure events. These error reports tend to include high percentages of spurious and/or duplicate error reports that obscure any understanding of the actual middlebox reliability. The present techniques can filter the error reports to identify the more germane or valuable error reports (e.g., those error reports which contain useful information). These filtered error reports can be correlated with other middlebox-related data to specific types of devices and/or to models of an individual device. The correlated error reports can be used to evaluate and/or predict middlebox reliability in various ways; some of which are described below.

System Architecture Example

Figure 1:
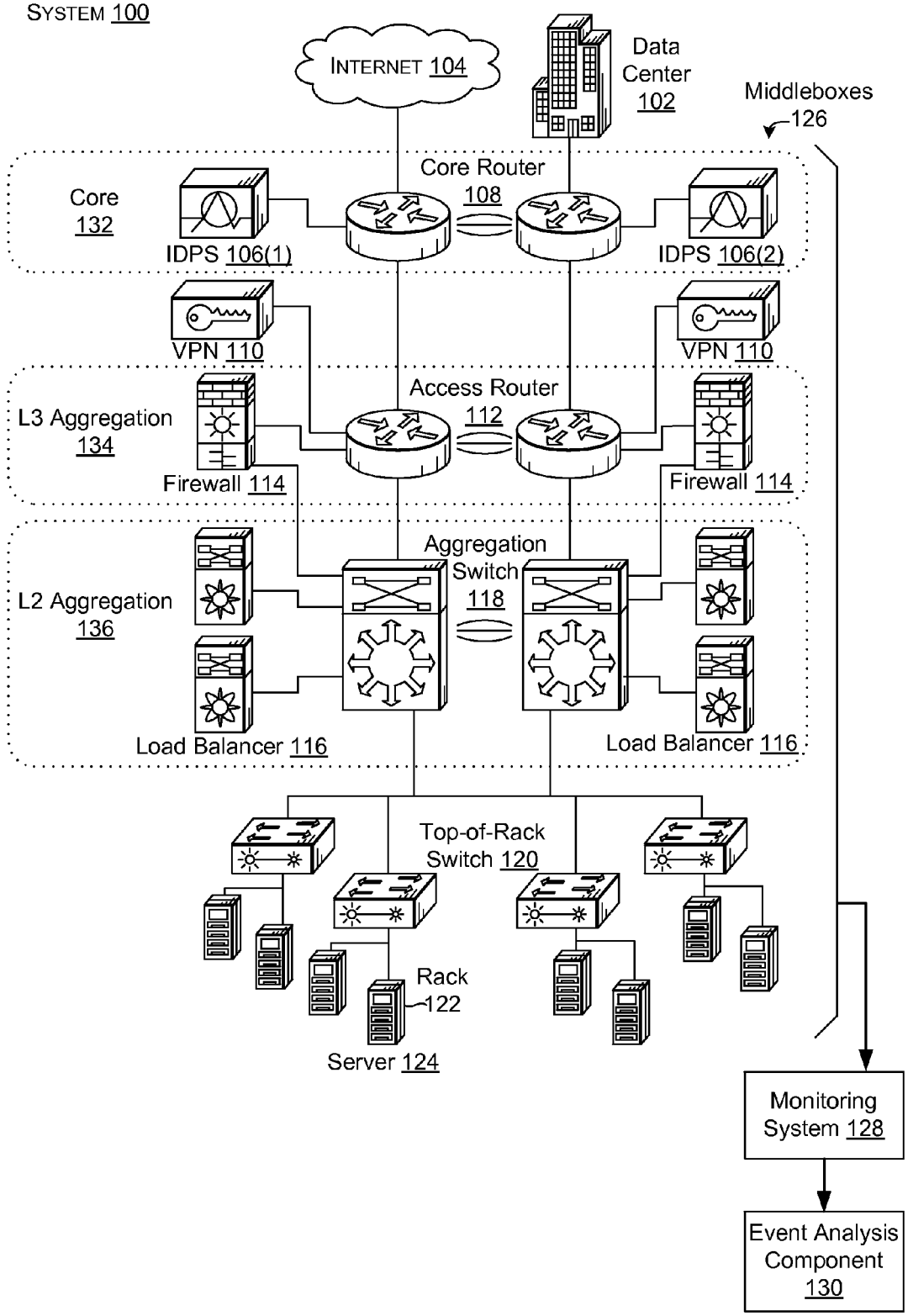
FIG. 1 shows an example system in which the present middlebox reliability concepts can be employed in accordance with some implementations.

FIG. 1 illustrates an example of a datacenter network architecture or system 100. The system 100 can be manifest in a datacenter 102 that is connected to a network, such as the Internet 104. In this case, the system 100 includes devices or components such as intrusion detection and prevention systems (IDPS) 106, core routers 108, virtual private networks (VPNs) 110, access routers 112, firewalls 114, load balancers 116, aggregation switches 118, Top-of-Rack (ToR) switches 120, and racks 122 of servers 124. For discussion purposes IDPS 106, VPNs 110, firewalls 114, and load balancers 116 can be termed as middleboxes 126. The middleboxes can be organized into a hierarchy that offers redundancy, such as is illustrated in the example of FIG. 1.

A monitoring system 128 can monitor reliability of the datacenter network architecture 100 as a whole and/or of individual components. An event analysis component 130 can utilize information obtained by the monitoring system to provide useful reliability information relating to datacenter network architecture and/or the individual components.

From a logical standpoint, the system 100 can be organized into a hierarchy that includes a core layer 132, an L3 aggregation layer 134, and a L2 aggregation layer 136. This logical organization can be based on the functional separation of Layer-2 (trunking, VLANs, etc.) and Layer-3 (routing) responsibilities.

ToR switches 120 (also known as host switches), connect the servers 124 to a remainder of the system 100 via a network represented by connecting lines in FIG. 1. Host ports in these ToR switches are often 10/100/1000 Ethernet, with the uplinks being Gigabit Ethernet or 10 GE ports. The ToRs can be connected upstream to a pair of aggregation switches 118 that form a redundancy group (e.g., the group contains multiple members and individual members can perform the switching function in the event that the other member fails). These aggregation switches can serve as an aggregation point for Layer-2 traffic and typically support high-speed technologies such as 10 Gigabit Ethernet to carry large amounts of traffic (e.g., data).

Traffic from aggregation switches 118 can be forwarded to the access routers 112 which can be deployed in pairs for redundancy. Access routers 112 can use Virtual Routing and Forwarding (VRF) to create a virtual, Layer-3 environment for each tenant. (A tenant is a service or application hosted on servers which uses network devices for connectivity—route traffic from/to users or other services to/from its hosted servers.) The access routers 112 can aggregate traffic from up to several thousand servers 124 and route the traffic to core routers 108 that can connect to the rest of the system 100 and Internet 104.

Load balancers 116 can improve the performance of hosted applications. Redundant pairs of load balancers 116 can connect to each aggregation switch 118 and perform mapping between static IP addresses (exposed to clients through DNS) and dynamic IP addresses of the servers 124 that process user requests. Load balancers can support different functionalities such as NAT, SSL acceleration, cookie management, and data caching.

Firewalls 114 can protect applications from unwanted traffic (e.g., DoS attacks) by examining packet fields at IP-, transport- and sometimes even at the application layer against a set of defined rules. While software-based firewalls can be attractive to quickly implement new features, hardware-based firewalls are typically used in datacenters to provide performance-critical features.

VPNs 110 can augment datacenter network infrastructure by providing switching, optimization and security for web and client/server applications. The VPNs can provide secure remote access via SSL VPN.

There can be other middleboxes 126, such as NATs, WAN optimizers, proxies and media converters, among others. A media converter device can perform on-the-fly conversion of application level data, transcoding of existing web pages for display on hand-held wireless devices, and transcoding between various audio formats for interconnecting mobile phones with VoIP services.

The monitoring system 128 can accept event log streams from syslog, for example, and perform functions such as reformatting, filtering data based on rules and routing messages to any installed rule engines or archival log files. These logs can contain information about what type of network component experienced an event, the event type, the other end-point of this component, and a short machine generated description of the event.

Network operators may troubleshoot network faults through problem tracking systems or "ticketing" systems that coordinate among network engineers working on the problem. Some troubleshooting systems are built around the NOC RFC. In such a case, a unique identifier herein referred to as NOC TicketID is assigned to each failure event. These tickets contain structured information about when and how an event was discovered and diaries of steps taken by the engineers in troubleshooting and mitigating the problem.

Operators can use a maintenance tracking and revision control system to track activities such as device provisioning, configuration changes, and/or software upgrades throughout the system 100. The maintenance tracking and revision control system can be features of the monitoring system 128 or a separate system. Before debugging an outage, a network engineer can check the maintenance tracking system for on-going and planned maintenance. The network engineer can use the revision control system to detect any recent changes to the device configuration files. Network traffic carried on network interfaces (links) can be logged using SNMP polling that averages traffic seen every five minutes, for example. Other sources of traffic information can be obtained from sampling based approaches such as sFlow. Traffic monitoring systems can use the MIB format to store the data that includes fields such as the interface type (token ring, Ethernet etc.), the other end of the interface, the interface status (up/-down), and/or the number of bytes sent or received by the interface, among others.

Event analysis component 130 can utilize event logs obtained by the monitoring system 128 to evaluate system and/or component reliability. For instance, additionally or alternatively to the event logs obtained from the monitoring system the event analysis component 130 can utilize data collected by network operators. For example, network operators can detect faults from network devices and analyze root causes by using monitoring alarms, such as syslog and SNMP traps, and by monitoring device status via ping and SNMP polling. The event analysis component 130 can obtain any other middlebox related data to use in analyzing middlebox reliability. Non-limiting examples of such data can include traffic data, configuration data, maintenance data, prior failure history data, and/or device meta-data.

Event analysis component 130 can correlate the above mentioned data with failure events to extract failures impacting network traffic and to reverse-engineer the topology information using link-level connectivity as the topology changes from time-to-time. As used herein a failure can be thought of as an event that causes a device or a link to be unavailable to perform its intended task. Specifically, a link failure can be thought of as occurring when the connection between two devices is down. Similarly, a device failure can be thought of as occurring when the device is not functioning for routing/forwarding traffic.

Some implementations of event analysis component 130 can filter several types of spurious network event logs, such as inaccurate event logs, duplicate event logs caused by multiple devices reporting the same event, single events being recorded as multiple events, and "shadow" reports (e.g., chatty events). In regard to inaccurate event logs, syslog messages can be spurious with devices sending multiple notifications even though a device is operational. In regards to multiple reporting devices, two or more devices (e.g., neighbors) may send notifications for the same event leading to redundant event logs (e.g., multiple redundant middlebox error reports). The error reports can be thought of as redundant if subsequent error reports relate to an error that was reported by an earlier error report. Regarding a single event being recorded as multiple events, a flapping device can generate multiple down and up messages which get logged as different events.

Shadow events can be thought of as events being triggered due to devices which are being scheduled for replacement or have been detected as faulty by operators but which are awaiting repairs. In some cases this effect can be severe with some devices (e.g., "chatty" or "shadow" devices) sending more than a thousand device down notifications over a few hours because the notification system did not suppress them during the troubleshooting window. Techniques that the event analysis component 130 can employ to filter several types of spurious network event logs are described below relative to FIG. 6.

To summarize, the event analysis component 130 can characterize the reliability across different types of middleboxes and across different series of devices of a given type, or those belonging to the same service or application, or by data center, or any other logical or physical grouping, by applying event filters to de-noise monitored datasets.

The event analysis component 130 can also correlate the filtered data across multiple dimensions and perform inference analysis. In some cases, the correlation can be performed solely on the filtered event logs. For instance, such correlation can identify a pattern of failures from the filtered event logs. One such example can compare a number of failure events per device of a given device type to identify individual devices with a high failure rate. Another example can compare downtimes per failure event among different devices of a device type.

In other cases, the correlation can be performed on the filtered event logs and other middlebox-related data from other sources. As mentioned above examples of such other middlebox-related data can include traffic data, configuration data, maintenance data, prior failure history data, and/or device meta-data. Correlating the filtered event logs with other middlebox related data from other sources can enhance the value of the data for reliability determination. The latter case can provide highly reliable data upon which to perform the inference analysis.

Event Analysis Component Example

Figure 2:
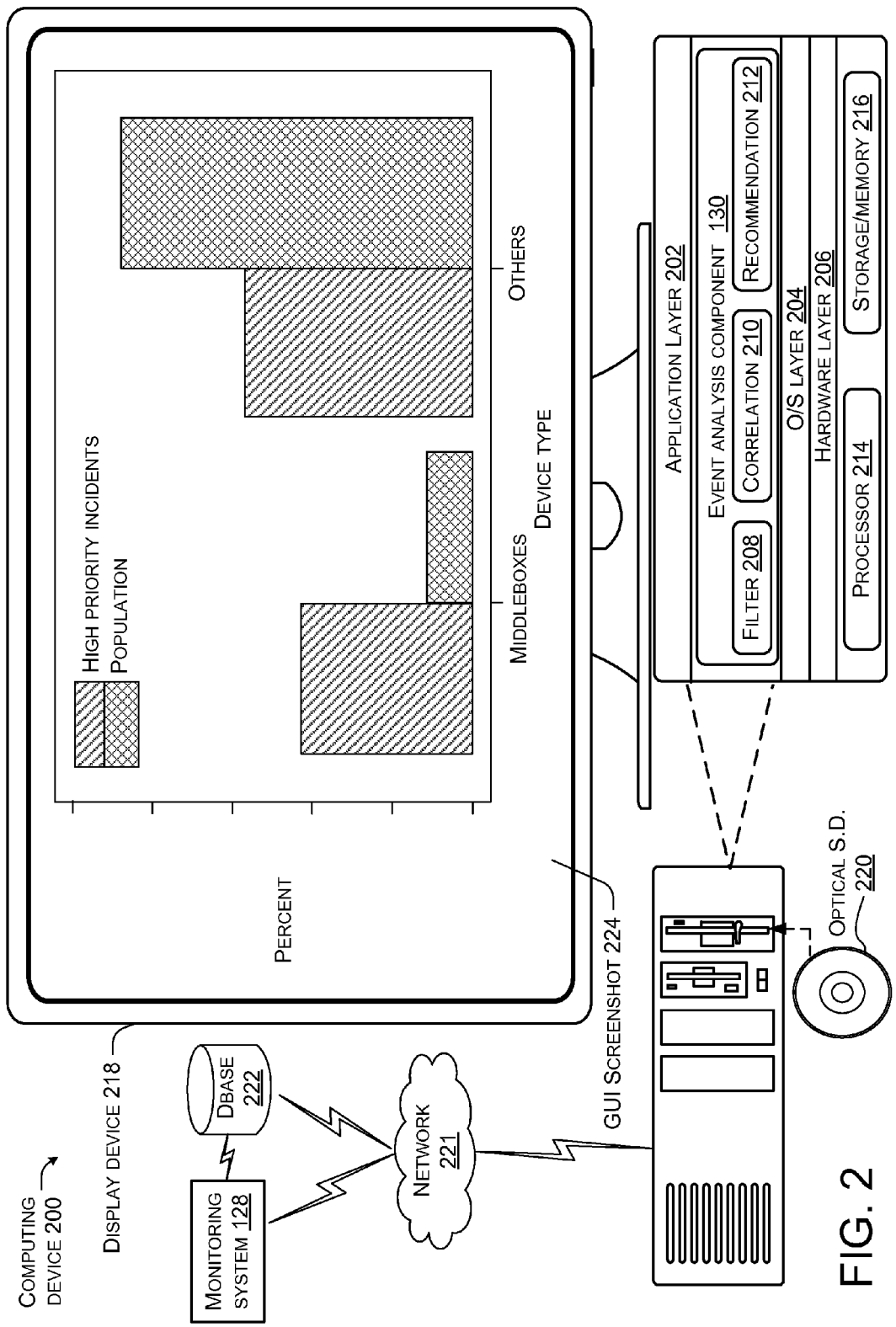
FIG. 2 shows an example computer or computing device that can be configured to accomplish middlebox reliability concepts in accordance with some implementations of the present concepts.

FIG. 2 shows event analysis component 130 embodied on a computer 200. In this case, computer 200 is manifest as a desktop computer. The term "computer" or "computing device" are used interchangeably, and as used herein can mean any type of device that has some amount of processing capability. While specific examples of computers are illustrated for purposes of explanation, other examples of such computers can include traditional computing devices, such as personal computers, any of the devices introduced relative to FIG. 1, cell phones, smart phones, personal digital assistants, or any of a myriad of ever-evolving or yet to be developed types of devices. Further, a system can be manifest on a single computing device or distributed over multiple computing devices.

In this case, computer 200 can include an application layer 202, an operating system layer 204, and a hardware layer 206. The event analysis component 130 can be manifest as a program or application of the application layer 202, among other configurations. In this example, the event analysis component 130 can include a middlebox error report filter module (hereinafter, "filter module") 208, a middlebox error report correlation module (hereinafter, "correlation module") 210, and a middlebox recommendation module (hereinafter, "recommendation module") 212.

The hardware layer 206 can include a processor 214 storage/memory (e.g., computer-readable storage media(medium)) 216, a display device 218, and/or various other elements. For instance, the other elements can include input/output devices, optical disc readers, USB ports, etc.

Processor 214 can execute data in the form of computer-readable instructions to provide a functionality, such as an event analysis component functionality. Data, such as computer-readable instructions, can be stored on storage/memory 216 and/or received from another source, such as optical storage device 220. The storage/memory 216 can include any one or more of volatile or non-volatile memory, hard drives, flash storage devices (e.g., memory sticks or memory cards), and/or optical storage devices (e.g., CDs, DVDs, etc.), among others. As used herein, the term data can include computer-readable instructions (e.g., program code) and/or data that is received by a program (e.g., user input). The computer may also receive data in the form of computer-readable instructions over network 221 that is then stored on the computer (and/or on a storage device that is communicatively coupled with the computer) for execution by its processor. For example, the network 221 can connect computer 200 to monitoring system 128 and/or a database 222.

Alternatively to the illustrated configuration of computer 200, the computer can employ a system on a chip (SOC) type design. In such a case, functionality provided by the computer can be integrated on a single SOC or multiple coupled SOCs. For instance, the computer can include shared resources and dedicated resources. An interface(s) can facilitate communication between the shared resources and the dedicated resources. As the name implies, dedicated resources can be thought of as including individual portions that are dedicated to achieving specific functionalities. Shared resources can be storage, processing units, etc. that can be used by multiple functionalities.

Generally, any of the functions described herein can be implemented using software, firmware, hardware (e.g., fixed-logic circuitry), manual processing, or a combination of these implementations. The term "engine", "tool", "component", or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable storage/memory devices, such as computer-readable storage media. The features and techniques of the component are platform-independent, meaning that they may be implemented on a variety of commercial computing platforms having a variety of processing configurations.

As used herein, the term "computer-readable media" and "computer-readable medium" can include transitory and non-transitory instructions. In contrast, the terms "computer-readable storage media" and "computer-readable storage medium" and "computer-readable storage medium" exclude transitory instances and/or signals. Computer-readable storage media can include "computer-readable storage devices". Examples of computer-readable storage devices include volatile storage media, such as RAM, and non-volatile storage media, such as hard drives, optical discs, and flash memory, among others.

In some implementations, the filter module 208 can be configured to perform functionality relating to separating duplicate error reports from a remainder of the error reports in the dataset. The correlation module 210 can be configured to perform functionality relating to correlating individual error reports, such as by time of occurrence, date of occurrence, duration of occurrence, physical location, type, property, configuration setup, and/or functional role of involved middleboxes. The recommendation module 212 can be configured to perform functionality relating to predicting future reliability of individual middlebox device models. The recommendation module can also be configured to perform functionality relating to recommending a replacement date for individual middlebox device models.

Stated another way, the event analysis component 130 can achieve event filtering, denoising, correlation within the filtered error report data and/or across different data sources, cost vs. benefit analysis, reliability comparison, decision making, predicting failures, trend analysis, etc. These aspects are described in more detail below by way of example.

In this case, the event analysis component 130 can generate the GUI screenshot 224 by obtaining error reports from monitoring system 128 and/or database 222. The database 222 can include error reports from one or more datacenters. Error reports obtained from, or relating to one or more datacenters can be thought of as a dataset that is evaluated by the event analysis component 130.

The event analysis component 130 can separate individual error reports relating to middlebox devices and links connecting these devices from those of other datacenter devices. The event analysis component 130 can also identify error reports relating to high priority events from a remainder of the error reports. In some implementations, the event analysis component 130 can employ a systematic methodology that uses spatio-temporal panoramas of device failures and applies trend analysis to characterize middlebox reliability in datacenters. These aspects are described in more detail below.

FIG. 2 also shows a graphical user interface (GUI) screenshot 224 that can be generated by the event analysis component 130 from the dataset. GUI screenshot 224 illustrates that in one example datacenter, middleboxes make up a relatively small percent of the total number of the datacenter devices. However, these middleboxes contributed to a relatively high percent of the high priority incidents. Thus, middlebox reliability can have a disproportionately large impact on datacenter reliability. Note that the illustrated results are provided for discussion purposes and are representative of functions that can be performed by the present implementations. However, applying the present implementations to data from a different datacenter can produce different results than those illustrated and discussed relative to FIGS. 2-5.

To summarize, several features that can be offered by the event analysis component 130 are described above and below. These features can include characterizing middlebox reliability from a datacenter "site-up" vs. "cost-down" perspective. Another feature can involve characterizing middlebox reliability by comparing middlebox device type and models within an individual device type. A further feature can involve filtering shadow devices which log a significant number of failures even after their fault has been detected. Still another feature can apply a pipeline of event filters across network datasets to extract meaningful failures from data. A further feature can involve evaluating the effectiveness of middlebox redundancy when a redundancy group has more than two components. Still another feature can involve applying spatial panoramas and trend analysis to identify the most failure prone network elements, such as the more or most failure prone middlebox device types and/or models within a device type. These features are described more below relative to FIGS. 3-6.

Figure 3:
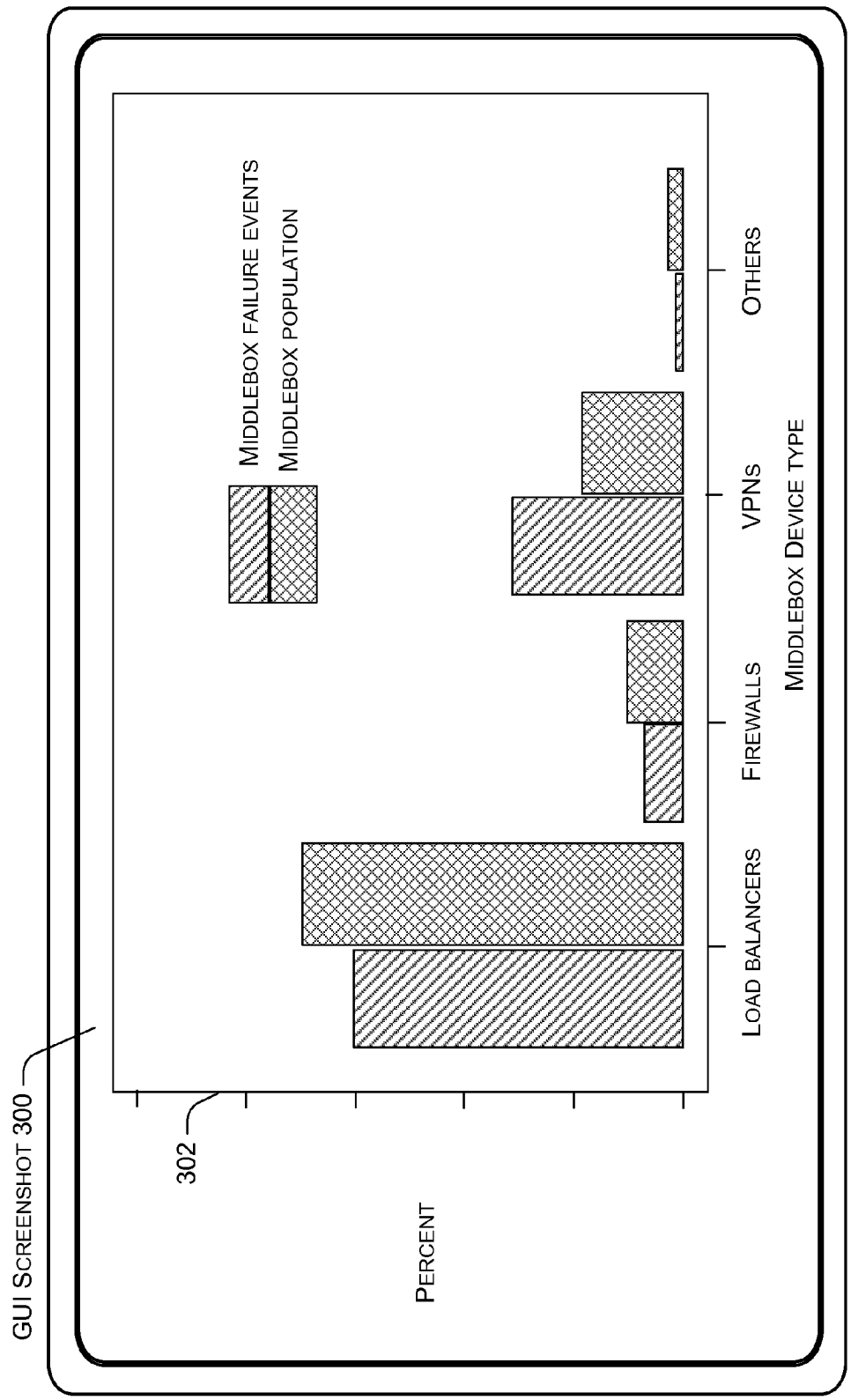
FIGS. 3-5 show screenshots of graphical user interfaces that can be generated relative to middlebox reliability concepts in accordance with some implementations of the present concepts.

FIG. 3 shows another GUI screenshot 300 that can be generated by event analysis component 130 operating on the dataset introduced relative to FIG. 2. This screenshot shows a graph 302 with a horizontal axis defined by middlebox device type and a vertical axis defined by percent. Illustrated middlebox device types are load balancers, firewalls, VPNs, with the remainder grouped as "others". In this dataset example, load balancers make up a majority of the middlebox population and account for a majority of the middlebox failure events. Also of note, VPNs make up a relatively small amount of the middlebox population and account for a relatively high percentage of the middlebox failure events.

As mentioned above, the event analysis component 130 can balance "site-up" vs. "cost-down" considerations. "Site-up" can relate to an availability of services provided by the datacenter. Stated another way, what percent of the time are the services available such as may be defined in a service-level agreement. "Cost down" can include all costs associated with providing the services, such as datacenter, capital costs, software, maintenance and management costs, among others. For example, one goal can be to increase (and potentially maximize) service availability while keeping costs down. For instance, keeping a large inventory of spare devices can ensure that failed devices can be quickly replaced to minimize downtime. However, this incurs significant costs and spares themselves might be faulty or become obsolete over time. To balance this tradeoff, event analysis component 130 can identify highly failure prone (and potentially the most failure prone) middleboxes for replacement that exhibit high downtime or a high number of failures.

The event analysis component 130 can also indicate sufficient numbers of spares to maintain as backup (e.g., recommended number of spares). The event analysis component 130 can also provide information that can aid in understanding the root causes of middlebox failures. This knowledge can be useful for network troubleshooting. Further, the event analysis component 130 can analyze the effectiveness of middlebox redundancy in masking failures. The information displayed in FIGS. 3-5 can be utilized by the event analysis component 130 when balancing these considerations.

Figure 4:
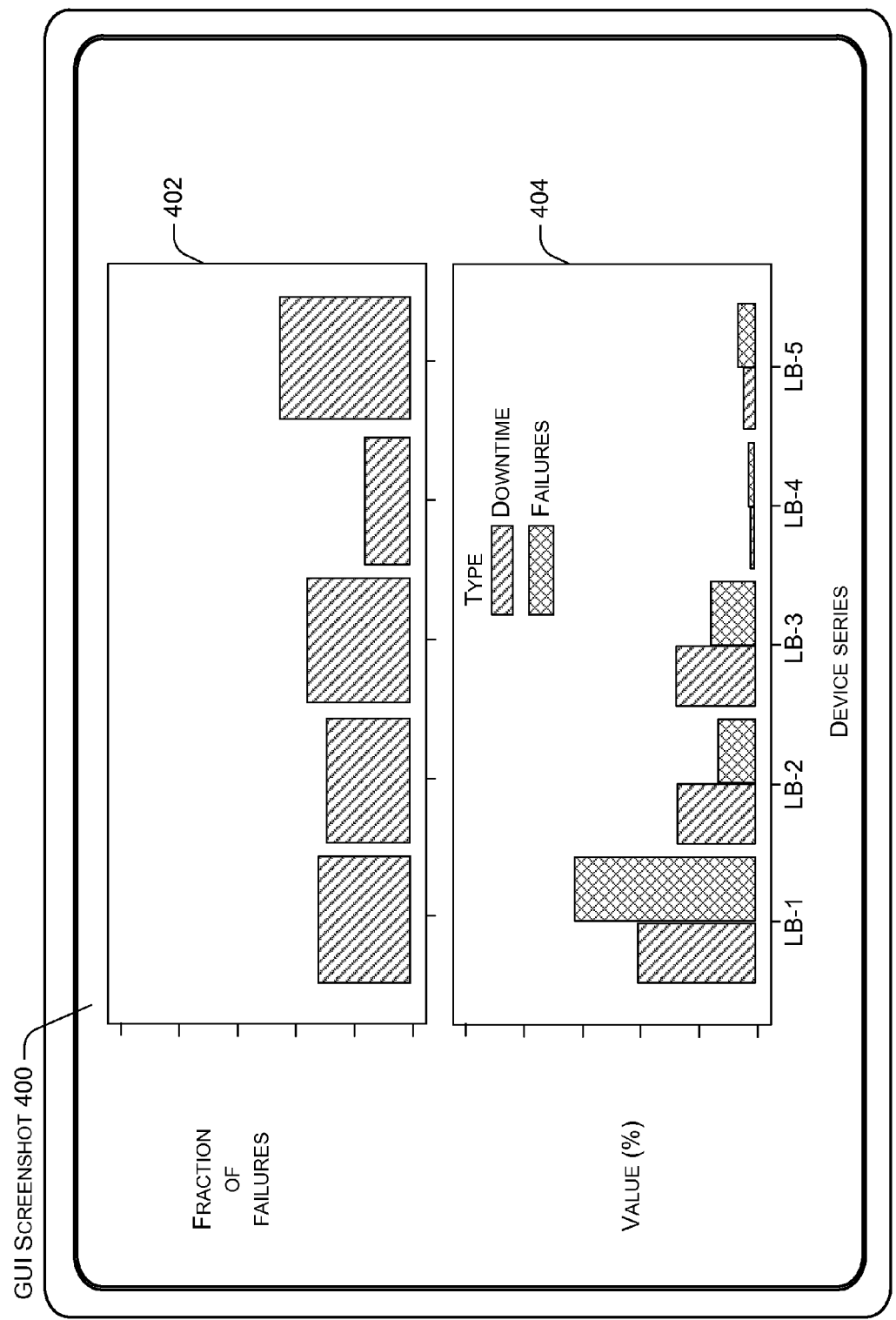

FIG. 4 shows a GUI screenshot 400 that characterizes middlebox type reliability across brands/vendors, platforms, models and/or series. In the illustrated example the middlebox type is load balancers. The load balancers are organized by series as LB-1, LB-2, LB-3, LB-4, and LB-5. For long-term provisioning, one goal is to understand and compare device reliability across different vendors and device families. In particular, a point of interest can include reliability by brand, series, and/or model. Another point of interest can identify which problems are common to a device brand, series, and/or model.

The event analysis component 130 can utilize this information to compare device reliability across load balancer generations. Both hardware and software improvements during a study period can also be captured by the event analysis component 130.

The event analysis component 130 can identify failure root causes. In the test case the main root causes of load balancer failures due to hardware are faulty power supply units (PSUs), cabling, ASIC, and memory problems; those due to software are reboot loops, software version incompatibility between active and standby devices, port flapping; maintenance/configuration e.g., authentication issues, VIP reallocation, RFC Implementations; and the remaining are unknown problems. For firewalls, the root causes were mainly misconfigurations, software bugs, and network card failures. VPN failures were attributed to errors in VLAN reallocation and SNAT port exhaustion. Of course, beyond the illustrated example, the event analysis component 130 can show root cause type and its contribution to number of failures and downtime of a middlebox device type in any manner that provides useful information.

The event analysis component 130 can determine the effectiveness of middlebox redundancy. For instance, the event analysis component can identify the redundancy between load balancers and aggregation switches in reducing the impact of failure on network traffic (measured in terms of lost bytes) and the percent of the events which experience zero impact. For example, in one instance, two potentially key root causes of this ineffectiveness could be software version inconsistencies between primary and backup devices and configuration bugs in the failover mechanism.

The event analysis component 130 can identify individual middlebox devices that cause inordinately high amounts of failures. For instance, a few devices contributed to a significant number of failures in one device family. Further, a new load balancer generation exhibited a higher relative failure rate than its previous generation. In this case, the event analysis component 130 determined that one possible cause of the higher failure rate was due to software bugs. The event analysis component 130 also identified a family of load balancers having faulty power supply units (PSUs) which could have been detected as early problem indicators by aggregating failure root causes across that type. Without the event analysis component 130 the faulty PSUs were repaired in isolation without recognition of the scope of the problem. The event analysis component 130 can identify faulty devices exhibiting unexpected reboots which led to the defective device being sent back to the vendor. The event analysis component 130 can then determine whether the applied fix was effective or whether another eventually solved the problem.

The event analysis component 130 can identify early problem symptoms to enable proactive repair and maintenance of a model of a middlebox device type. Further, as evidenced, the event analysis component 130 can identify whether a new product line is more reliable than its predecessor. This analysis can further be used to compute a cost of ownership metric. The event analysis component 130 can utilize this information to determine whether it is cost-effective to continue with a faulty product line by purchasing additional spares or to replace it (the product line) at a point in time (see description related to FIG. 5). Finally, this information can be useful feedback to manufacturers/vendors in fixing existing problems and adding new features in future generations.

The following discussion offers further details regarding load balancer reliability. Failing load balancers whose links were not carrying any traffic before the failure can be separated into two categories: (i) inactive (no traffic before or during the failure) and (ii) provisioning (no traffic before the failure but some traffic during the failure). When links are idle and functioning, the links tend to exchange small amounts of control traffic, such as 30 bytes/sec. Therefore, accurate link filtering can utilize 30 bytes/sec as a threshold. Thus, those load balancers above 30 bytes/sec are considered to be carrying traffic.

The event analysis component 130 can create a panorama of how load balancer failures are distributed across a measurement period ordered by datacenters and applications to which they belong. The panorama can represent failure over unit time, such as per day. In one configuration the panorama can represent widespread failures as vertical bands and long-lived failures can be represented as horizontal bands. Thus, event analysis component 130 can recognize vertical bands as failures that are spatially distributed across multiple devices around the same time. Notable reasons for this can include planned software upgrades/RFCs. In such a case the device software is being upgraded to a newer version or all devices across multiple datacenters are being upgraded.

The event analysis component 130 can also recognize unplanned inconsistencies. For instance, occasionally, after a device replacement, there is a software mismatch between the new device and the old standby. For example, if any control protocols undergo a change as a result of a software upgrade without a proper backward compatibility (upgrade as opposed to update), then any bootstrapping could subsequently fail. In this scenario, all devices involved in the group tend to be taken down for a software upgrade.

The event analysis component 130 can also recognize effect propagation where failure of devices higher up in the topology trigger alerts connected devices in the underlying sub-tree. For instance, when an access router fails, it tends to trigger alerts in all firewall devices connected to it.

The event analysis component 130 can also recognize long-lived failures as horizontal bands in the panorama. These horizontal bands can indicate device failures on the same device across time. The event analysis component 130 can detect these as early warnings of impending failures. This scenario can be common when a device is about to fail. For instance, one suspected device may have SDRAM ECC errors and try to recover (thus triggering multiple failure events) but keep being power cycled as a quick-fix.

The event analysis component 130 can also recognize standby/failover error. For example, this can occur when a standby device is not notified of its peer being replaced after a failover. For instance, if the standby device is not aware that the active device is being replaced then the standby device will tend to log multiple down events indicating that the active device is down when in fact, the active device is physically absent.

The event analysis component 130 can also recognize faux devices. For example, an individual middlebox device might be monitored while the middlebox device is not connected to the operational network. In this scenario, if the middlebox device is switched over to active, it tends to log multiple events indicating that its links are down.

Annualized Device Failure Rate

The event analysis component 130 can compare the reliability of load balancers across device generations/vendors (e.g., across manufacturers, models, etc.) using the probability of failure metric, among other techniques. In one implementation, this metric is computed by dividing the number of middlebox devices of a given type that observe failure by the total population of that type.

FIG. 4 shows a GUI screenshot 400 that illustrates the annualized failure rate for different load balancer generations. In the illustrated example, five of the most prevalent models of load balancers (LB-1, . . . , LB-5) are arranged by the decreasing size of their population from left to right on the screenshot GUI.

In the illustrated upper graph 402, the failure rate of the five load balancer models tends to vary significantly. In terms of overall failure probability, load balancers (LB-1, LB-3 and LB-5) are the least reliable with about a one-third chance of experiencing a failure. The failure rate increased from an older generation LB-1 to a newer LB-3 indicating potential defects in the newer generation. Lower graph 404 shows the fraction of failures and downtime contributed by each model. Observe that LB-1 exhibits a large failure rate as well as contributing significantly to the total number of failures and downtime. However, note that in one comparison to other load balancers, the fraction of failures contributed can be higher than the downtime indicating that most problems are short-term failures. Or conversely, the event analysis component 130 can identify when a particular model is experiencing more long term failures than other models. The event analysis component 130 can validate this observation by using time-to-repair plots where a short time to repair indicates transient problems. In this instance, a majority of these problems were due to link flapping. The event analysis component 130 can also determine the percentage of downtime and failure per device for each model.

Time to Repair

In some implementations, the time to repair for a middlebox device can be defined as the time between a down notification for a device and when it is next reported as being back online. There are two types of failures: short-lived transient failures where the network engineer may not always intervene to resolve the failure and long-term failures where the middlebox device or its component is usually replaced or decommissioned. Note that for long-term failures, the failure durations may be skewed by when the network troubleshooting tickets were closed by network operators. For instance, support tickets usually stay open until the middlebox device in question is replaced with a spare and this duration can be in the order of days.

The event analysis component 130 can also calculate the time to repair for load balancers. Short-lived failures may be attributed to software problems (e.g., OS watchdog timer triggering a reboot). Comparing across load balancers, the time to repair for the generations increased for LB-3 indicating potential problems with troubleshooting these devices.

However, for newer generation devices of LB-2, the time to repair is relatively lower indicating that newer generations get fixed quickly.

The event analysis component 130 can calculate annualized downtime for middleboxes. The availability of a device can be estimated using the annualized downtime metric, i.e., the degree to which a device or network component is operational and accessible when required for use during the period of observation.

Time to failure of a device can be defined as the time elapsed between two consecutive failures. Since this metric requires that a device fail at least twice, devices having only zero or one failures during a measurement period can be excluded. In the analyzed dataset, load balancers tend to experience a number of short-lived transient failures, i.e., irrespective of their device generation, a majority of them fail within a relatively short amount of time, such as one or two days. However, specific percentages of failures, such as the 95th percentile may be weeks or months between failures. This indicates that even among devices that fail multiple times, there tends to be two types of devices: robust ones that failed once in one or two months and failure prone devices that experience numerous failures (mostly within 24 hours). The event analysis component 130 can identify notable causes of these failures, examples of which are now described. One notable cause of frequent failures can be referred to as link flapping (Sync Problems). Link flapping relates to unexpected cases where standby-devices are unable to sync with active devices and hence raise alerts indicating link failures. Another frequent cause of failures is neighbor maintenance. Neighbor maintenance refers to devices that are power recycled/updated as part of routine maintenance so when a device goes down, its neighbors start sending DOWN notifications. Reboot loops are another frequent cause of failures. Devices get stuck in a reboot loop where the devices are either hard-power recycled or sent back for replacement. A further frequent cause of failures is field test failures. Field test failures result when network engineers routinely perform EUD (End-User Diagnostics) tests to ensure that the device health is at acceptable levels. During this procedure, devices are restarted or tested multiple times.

The next discussion point relates to failure trends across different middlebox device types. The event analysis component 130 can create timeline trends for the number of failure events and the number of devices that failed. In one implementation, subplots can show two curves—a cumulative curve that sums up the number of failures across time and another curve to show the actual number of failures. In some cases the two curves are similar for both the devices and failure events. Such an occurrence can indicate that the number of devices that fail is on par with the number of failures.

In other instances the number of failure events is far higher than the number of devices that failed indicating that a few bad devices are responsible for a majority of failures. Further, a sudden increase in the slope can indicate major problems during that period of observation.

The event analysis component 130 can further identify the major root causes observed for each load balancer type. In the explored dataset unexpected reboots are a common root cause across all device types due to software bugs or faulty hardware components. For reboots due to software problems, the main reasons were fault in the switch card control processor, licensing bugs, and incorrect value setting for the OS watchdog timer. Hardware-related reboots were caused due to cache parity errors, power disruption, hard disk failures, faulty EEPROM or dual in-line memory modules, and/or failed network cards. Overall, across both planned and unexpected outages, hardware problems contributed relatively fewer problems e.g., faulty PSUs, cabling problems, ASIC and memory problems; software contributed relatively more problems e.g., reboot loops, active/standby version incompatibility, and port flapping; maintenance/configuration contributed relatively few problems e.g., authentication issues, VIP reallocation, RFC Implementations; and the remaining problems were attributed as unknown root causes.

The event analysis component 130 can estimate the Impact of failures. In some cases, quantifying the impact of a failure is difficult as it can require attributing discrete "outage" levels to annotations used by network operators such as severe, mild, or some impact. To circumvent this problem, the event analysis component 130 can correlate the network event logs with link-level traffic measurements to estimate impact of a failure event. However, it can be difficult to precisely quantify how much data was actually lost during a failure because of two complications: (i) presence of alternate routes in datacenters, and (ii) temporal variations in traffic patterns. In one implementation, the event analysis component can estimate the failure impact in terms of lost network traffic that would have been routed on a failed link in the absence of the failure. Specifically, the event analysis component can first compute the median number of bytes on the links connected to a failed device in the hours preceding the failure, median before, and the median bytes during the failure. Then the event analysis component can estimate the amount of data that was potentially lost during the failure event as: loss=(medianbefore−medianduring)×failure duration (1) where duration denotes how long the failure lasted.

The event analysis component 130 can evaluate the effectiveness of network redundancy in mitigating failure impact as it is a de-facto technique for fault tolerance in datacenters. Within a redundant group, one device is usually designated the primary and the rest as backups. However, note that some devices may belong to multiple redundancy groups.

The event analysis component 130 can observe large redundancy groups of up to 12 load balancers connected to a single aggregation switch using link-level connectivity. The event analysis component 130 can estimate the effectiveness of redundancy by computing the ratio of median traffic (bytes) entering a device across all links during a failure and the median traffic entering the device before the failure. The event analysis component can then compute this ratio across all devices in the redundancy group where the failure occurred. Network redundancy is considered 100% effective if this ratio is close to one across a redundancy group. This ratio can be thought of as normalized traffic.

The event analysis component 130 can create a graph to show the distribution of normalized traffic for individual devices and redundancy groups. Several reasons can contribute to why redundancy is not 100% effective in masking the failure impact. A first reason can relate to faulty failovers. In some cases the primary device failed when the backup was experiencing an unrelated problem and hence led to a failed failover. In other cases, software/protocol bugs prevented the failover from happening correctly often sending devices into a deadlock state. Software mismatch can be another source of faulty failover. In such cases, the OS version on the backup device may be different from the primary device leading to differences in the failover protocol. In these cases, the network engineer can perform a break/fix maintenance to bring both devices to the same software version. A further source is mis-configurations or cases where the same configuration error was made on both primary and backup devices.

Other Middleboxes

The event analysis component 130 can analyze the reliability across different types of firewalls and VPN devices which show a higher degree of robustness compared to load balancers. The event analysis component can use the metrics introduced relative to load balancers to compare device reliability across different generations of a model and vendors.

For instance, for a given dataset, firewall related failures may tend to occur relatively infrequently or more frequently compared to load balancers.

To gain insight into the kind of failures affecting middleboxes (notably, load balancers due to their large footprint), the event analysis component 130 can analyze the network tickets associated with each individual series to develop a more thorough understanding of the problems facing datacenters. The results can be studied with network operators.

Early Problem Symptoms

As noted above, the event analysis component 130 can identify problems grouped by a device type. In some implementations, the event analysis component can use the grouped problems to determine early failure indicators of problems with the entire set of devices in that type. In one such example, although the operations team had been proactively repairing faulty power supply units (PSUs) associated with load balancers, most repairs/replacements were performed in isolation. The analysis from the event analysis component 130 revealed load balancers of type LB-1 to have a relatively high annualized failure rate. Analyzing network tickets associated with this series indicated that (i) devices were failing due to PSU problems even before the repairs started, (ii) out of all network tickets related to LB-1, a significant portion of them required that the device be replaced. This is somewhat surprising: while most devices have extended warranty, a device replacement risks operating at reduced or no redundancy until the replacement arrives, while keeping a large number of spares incurs significant costs.

In most cases where a device was sent back to the manufacturer for a post-mortem, their analysis did not prove to yield any useful results. This is likely due to the fact that most problems are believed to be isolated and unless needed, troubleshooting does not involve conducting specialized tests that uncover problem patterns. In comparison, the present approach of aggregating root causes across a device generation helped identify problem patterns. In this case, failing PSUs could have been used as early indicators of problems with the product line. A cost of ownership analysis can then be useful to decide whether to continue using a device model or gracefully upgrade it to newer models.

Another issue that was examined in further detail involved LB-3 load balancers where problematic devices were rebooting unexpectedly. The ticket diaries indicated that (i) the manufacturer was not able to find the root cause and (ii) in a large percentage of the problematic cases, the defective unit was sent back to the manufacturer for a replacement. The subsequent product-line upgrades from the manufacturer's website revealed this to be a software bug related to a watchdog timeout. This timeout got triggered in response to a high volume of network traffic on the management network. In this case, the newer generation LB-3 exhibited lower reliability than its predecessor LB-1. Ideally this bug should have been fixed with a software patch but instead it led to wastage of several weeks of troubleshooting man hours. One way to address this issue with third-party middlebox vendors is to perform rigorous functional verification prior to deployment.

Another issue that was examined in further detail related to the LB-1 series. The event analysis component 130's trend analysis and reliability and downtime estimates revealed that LB-1 suffered from the few bad apples effect i.e., the rate of increase of the slope of the cumulative count of failures curve is higher than the rate of increase of the slope of the cumulative count of devices curve. This indicates that only a few devices are contributing to a majority of failures and can be confirmed by high COV value for LB-1.

Trend analysis is a useful tool in uncovering these types of problems where a specific set of devices are more failure-prone than the rest of the population. There are many reasons why this happens. For instance, a fault with the regulated PSU will frequently cause power fluctuations leading to damaged parts. Even if the damaged parts are replaced, unless the fault is localized to the power supply unit, for example, the problem will repeat itself.

Another issue that was examined in further detail related to failover bugs due to version mismatches. This particular case study concerns LB-1 and LB-3 where devices were sent back to the manufacturer for replacement. A significant percentage of the events led to another simultaneous failure event being generated—the failover mechanism had failed. Subsequent troubleshooting revealed the root cause as an outdated software version on the standby device leading to failure of the new failover mechanism. Of course, this example is intended to represent occurrences in the test data and may not reoccur in other datacenter scenarios.

The event analysis component 130 can consider network redundancy at both the device level and the failover mechanisms. Techniques such as regular failover testing and checking for consistency of network configurations can be used to check the robustness of the failover mechanisms.

This robustness checking can provide additional information that can be useful for datacenter management decision, such as replace vs. upgrade control strategies. For instance, one of the examples described above involved a newer device generation which had lower reliability compared to its predecessor. More broadly, it raises a key question about deciding whether to keep replacing faulty devices in existing deployments or to upgrade to a new product line. Answering this fundamental question can involve a deeper understanding of multiple challenges. For instance, upgrading devices with their high-speed, feature-rich counterparts will likely require additional training for network engineers. Thus, the degree of familiarization with the upgraded device can be considered in making the decision to upgrade or not. For example, an undesirable consequence of this issue is a longer time to repair for devices, at least initially, due to unfamiliarity.

A further factor in the upgrading equation can be active/standby compatibility. For example, incorporating new versions of devices into an existing network may lead to unexpected problems e.g., the compatibility problems between primary devices and the standby devices as observed in the case studies. By computing a metric such as the cost of ownership (COO), decisions such as whether to purchase additional spares for a faulty product line or to gracefully replace a product line can be made. The primary cost elements of the COO model can be: (i) initial investment in purchasing the product, (ii) depreciation, (iii) cost of operation that includes space, personnel, and/or power expenses, (iv) cost of maintenance operations including downtime, repair cost, failure rates, and/or cost of spares, and/or (v) enhancement costs that include hardware/software upgrades and/or personnel training. Reliability analysis provided by event analysis component 130 can attempt to answer some of these questions.

Figure 5:
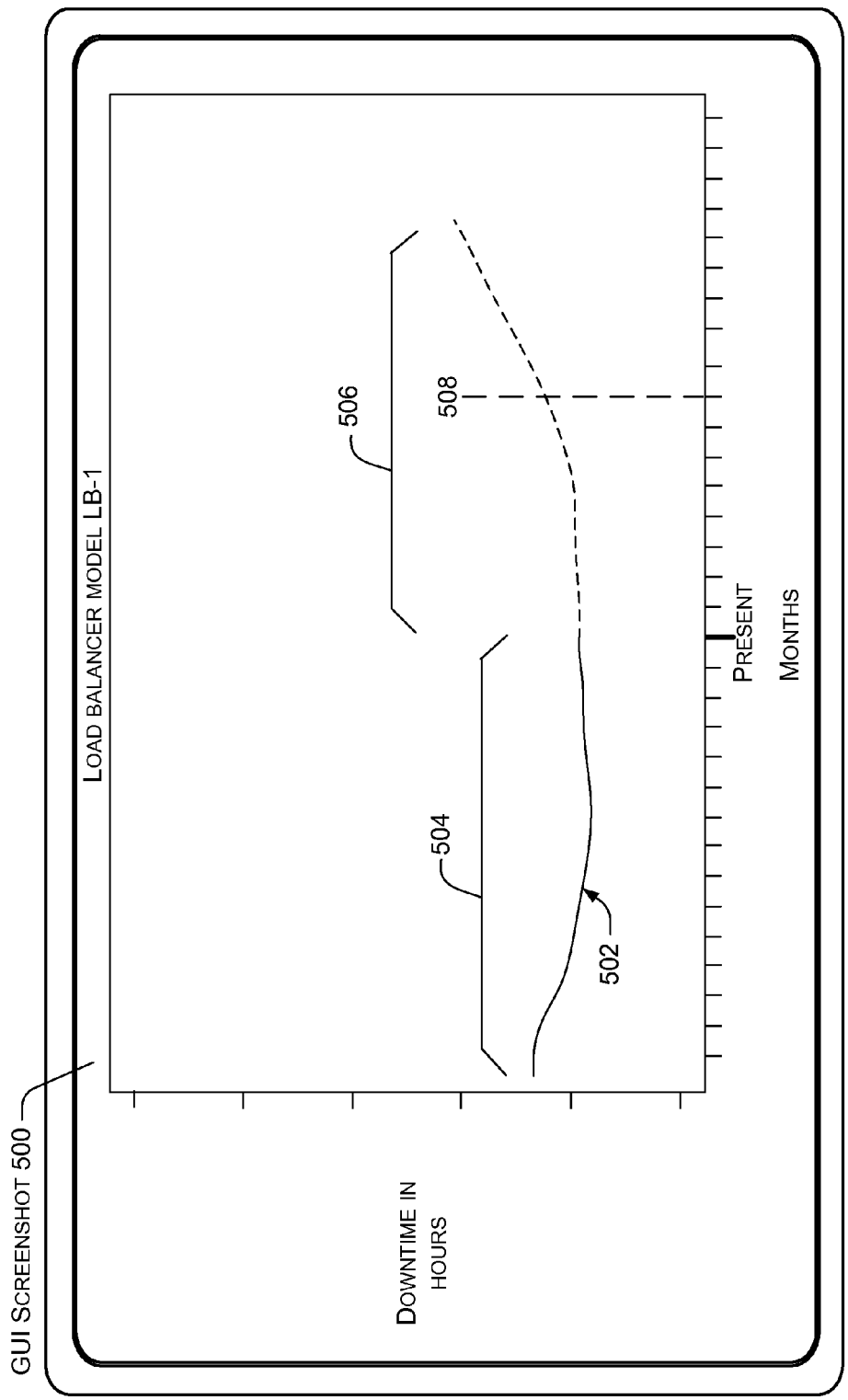

FIG. 5 offers a GUI screenshot 500 that can be generated to convey the reliability analysis. The GUI screenshot shows a graph 502 of downtime in hours (vertical axis) per month (horizontal axis). This particular graph relates to load balancer LB-1, but the concepts are applicable to other middleboxes. The graph 502 is separated into two sections: past reliability is indicated at 504 and predicted future reliability is indicated at 506. Further, graph 502 includes a recommended replacement point or date 508. The event analysis component 130 can generate graph 502 and recommended replacement point (e.g., replacement date) 508 utilizing the techniques described above and below. Replacement date information provided by the event analysis component can relate to how many devices to phase out, when, from which roles, what new devices to maintain on-board as their replacement, how to shift the traffic, etc.

The event analysis component 130 can also provide guidance regarding spare device management (e.g., what middlebox devices to keep on-site as replacements and how many). With existing ad-hoc spare management it is common for network engineers to not have replacement devices on-site. Delays in obtaining additional inventory can cause decreased system reliability. The event analysis component 130 can leverage several aspects of the above mentioned analysis to determine on-site inventory. Examples of two aspects that can be leveraged include (i) metrics such as annualized failure rates, time to failure and time to repair can be used to build device reliability models, and (ii) root cause analysis can be used to identify early problem symptoms in failing devices and to compute a requisite number of replacement parts as spares. This reliability information can be combined to balance cost vs. benefit tradeoffs of extended downtime of a device (e.g., situated at a network hotspot) because of delay in obtaining a spare against the holding costs of the inventory and the risk that the spares may become obsolete or fail themselves before being used.

The event analysis component 130 can also implement failover stress testing. This can reduce (and potentially avoid) instances where the primary and the backup device failed simultaneously due to mis-configuration of the backup device, cabling errors, and mismatch between software versions of the primary and backup.

The event analysis component 130 can provide useful information and/or services to organizations that own or manage datacenters as well as to vendors that design/manufacture middlebox devices. In regards to vendors, the event analysis component can provide robust test suites. As noted above, post mortem analysis of failed devices by the vendors did not yield conclusive results in some cases. As troubleshooting can involve significant time and personnel, it translates into repair costs for the vendor. Having detailed knowledge of the different type of problems observed for a particular device type will help design robust test suites that can automatically perform functional verification and model checking of newer generations of devices. This will help prevent commonly occurring hardware and software problems and meet the expectations of "operational readiness" quantified in terms of the probability that the equipment will be ready to start its function when called upon to do so.

The event analysis component 130 can also provide information regarding product-line life cycles. For instance, the event analysis component can generate an accurate estimate of device reliability that can aid the vendor in estimating the cost of spare parts inventory i.e., for a highly reliable device the vendor can produce less spare parts. This information can be inferred from the problem tickets raised by the vendor's customers e.g., datacenter operators.

METHOD EXAMPLES

Figure 6:
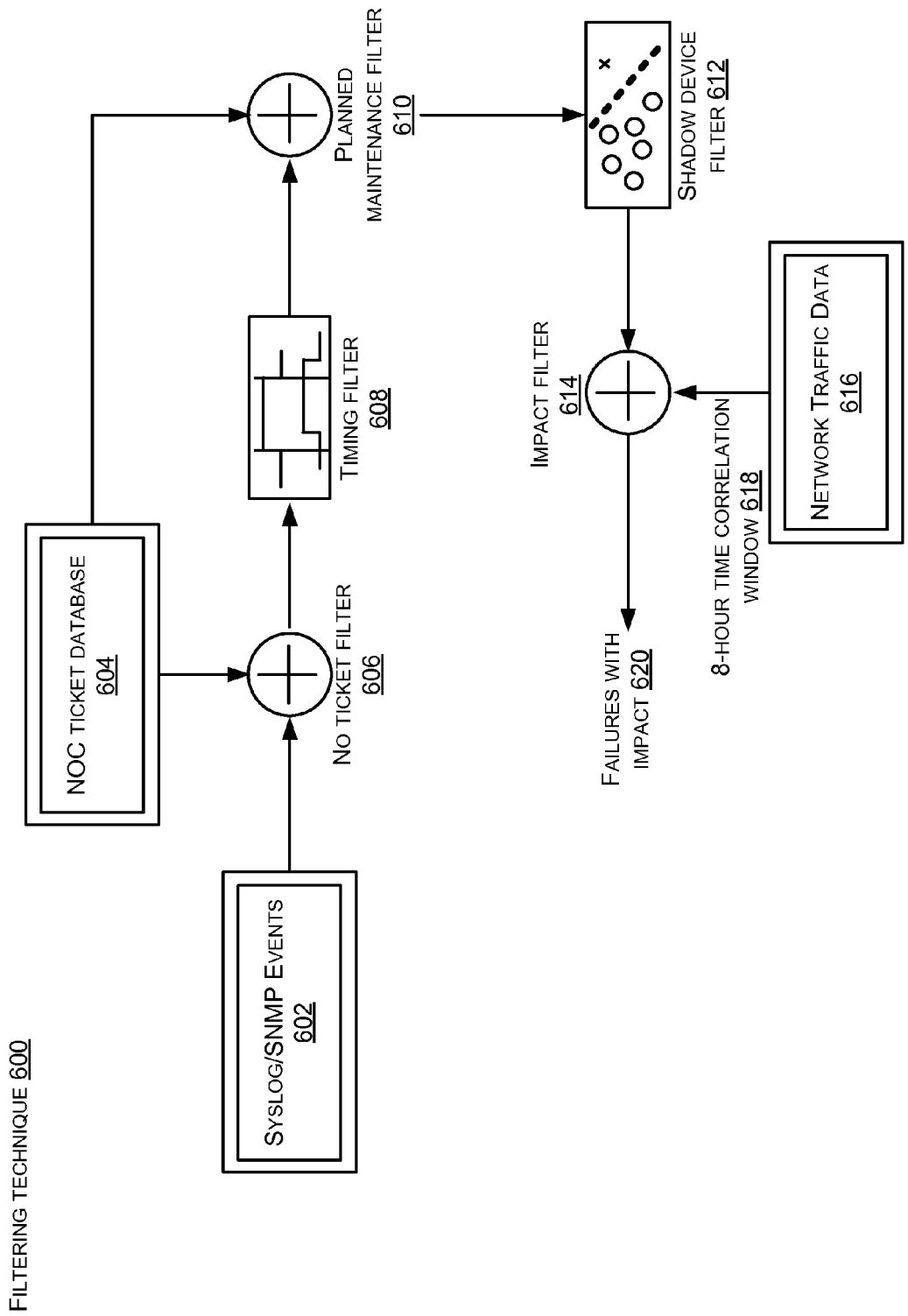
FIGS. 6-7 are flowcharts for accomplishing middlebox reliability concepts in accordance with some implementations of the present concepts.

FIG. 6 shows a filtering method or technique 600 for separating a sub-set of germane event tickets from less informative event tickets from a set. This technique can utilize events from various sources. In this case, the events are manifest as Syslog/SNMP events 602 and events from a NOC ticket database 604. In this implementation, obtained events that do not have an associated NOC ticket can be removed as a first pre-processing act at 606. This filter can be based upon the assumption that if an event was not dealt with by an operator, then it is likely that the event did not cause an impact.

The technique can employ a timing filter at 608. The timing filter can be used to fix various timing inconsistencies. In one implementation, the timing filter can first group events with the same start and end time originating on the same interface. This process can remove duplicate events. Next, the timing filter can pick the earliest start and end times of multiple events that originated within a predefined time window on the same interface. For example, any events that happened within a predefined time of 60 seconds on the same interface can be grouped into a single event (e.g., characterized as a single event). This process can reduce or avoid any problems due to clock synchronization and log buffering.

Next, the technique can group two events originating on the same interface that have the same start time but different end times. These events can be grouped into a single event that is assigned the earlier of the end times. The earliest end times can be utilized since events may not be marked as cleared long after their resolution. The technique can employ a planned maintenance filter at 610. Events caused by planned maintenance can have less value in understanding device behavior than unplanned events (e.g., unexpected outages).

The technique can employ a shadow device filter at 612. The shadow device filter can be useful to filter events being logged by devices being scheduled for replacement or that have been detected as faulty by operators but are awaiting repairs. The shadow device filter can identify these shadow devices by arranging the devices in the descending order of their number of failures. In one implementation, for a top percentage of the devices in this list, all events are merged that have the same "NOC TicketID" field. This constitutes an event in that events with the same ticket ID are likely to have the same symptoms. In one case the top percentage is defined as the top five percent, but of course other values can be employed in other implementations.

The technique can employ an impact filter at 614. An event can be defined as having an impact when the event affects application reliability e.g., throughput loss, number of failed connections or increased latency. In implementations without access to application-level logs, failure impact can be estimated by leveraging network traffic data 616 and computing the ratio of the median traffic on a failed device/link during a failure and its value in the recent past. For example, the value of the recent past can be set as the preceding eight-hour correlation window 618. Other implementations can use other values. A failure has impact if this ratio is less than one. The above acts can collectively allow the filtering technique 600 to identify the failures with impact at 620. Of course, other filters can alternatively or additionally be utilized.

Figure 7:
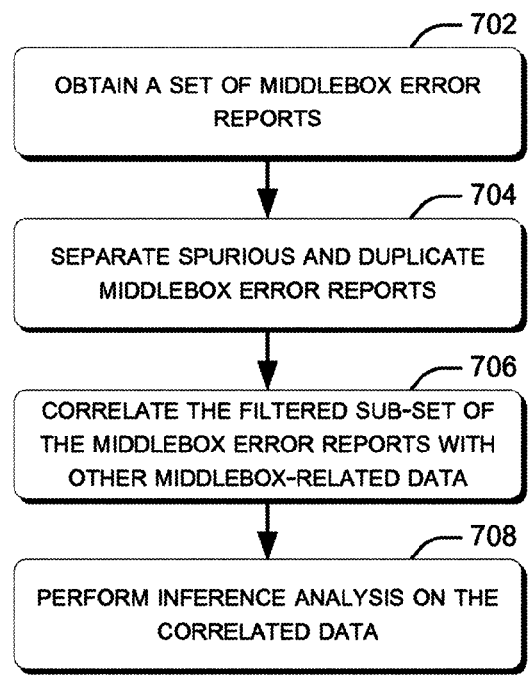

FIG. 7 shows a middlebox analysis method or technique 700. At 702, the method can obtain a set of middlebox error reports. In one implementation, the set of middlebox error reports can be obtained from a datacenter monitoring system or from a database that stores the set of middlebox error reports on behalf of the datacenter monitoring system.

At 704, the method can separate spurious and duplicate middlebox error reports from a filtered sub-set of the middlebox error reports. In one implementation, the separating can be accomplished by applying a pipeline of event filters to the set of middlebox error reports to generate the filtered sub-set of the middlebox error reports. In some cases, the pipeline can be created by selecting individual filters from a set of available event filters.

At 706, the method can correlate the filtered sub-set of the middlebox error reports with other middlebox-related data to produce correlated data. In one case, the correlation can identify failures that take a long time to fix. Further, groups of failures that happen at the same time or nearly the same time can be identified. Note that in some implementations, the correlation of block 706 can be performed only on the set of middlebox error reports obtained at block 702. In other implementations, the correlation can be performed on the set of middlebox error reports obtained at block 702 and/or upon data from other data sources. For instance, an example of other data sources that can be drawn upon can include traffic data, configuration data, maintenance data, prior failure history data, and/or device meta-data, among others. The correlated data can be especially indicative of middlebox reliability when compared to uncorrelated data. At 708, the method can perform inference analysis on the correlated data to estimate middlebox reliability. Some implementations can further apply spatial panoramas and trend analysis to identify relatively highly failure prone middlebox device types and/or models.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

Conclusion

Although techniques, methods, devices, systems, etc., pertaining to middlebox reliability are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. At least one computer-readable storage medium having instructions stored thereon that, when executed by a computing device, cause the computing device to perform acts, the acts comprising:
    obtaining a set of middlebox error reports relating to a set of middlebox devices having multiple different middlebox device types;
    separating spurious and duplicate middlebox error reports from a filtered sub-set of the middlebox error reports;
    correlating the filtered sub-set of the middlebox error reports with other middlebox-related data to produce correlated data; and,
    performing inference analysis on the correlated data to estimate middlebox reliability for multiple middlebox models within an individual middlebox device type or to evaluate effectiveness of middlebox redundancy.

2. The computer-readable storage medium of claim 1, wherein the middlebox reliability is estimated for the individual middlebox device type and for the multiple middlebox models within the individual middlebox device type.

3. The computer-readable storage medium of claim 1, wherein the separating comprises applying a pipeline of event filters to the set of middlebox error reports to generate the filtered sub-set of the middlebox error reports, and wherein the pipeline of event filters includes an individual event filter relating to time or another individual event filter relating to chatty events.

4. The computer-readable storage medium of claim 1, wherein the other middlebox-related data is obtained from sources other than the set of middlebox error reports, and wherein the other middlebox-related data comprises one or more of: traffic data, configuration data, maintenance data, prior failure history data, or device meta-data.

5. The computer-readable storage medium of claim 1, wherein the spurious and duplicate middlebox error reports are generated by the set of middlebox devices.

6. The computer-readable storage medium of claim 1, wherein the correlating is performed across multiple dimensions comprising: time of occurrence, duration of occurrence, physical location, type, property, configuration setup, or functional role of involved middleboxes.

7. The computer-readable storage medium of claim 1, wherein the performing inference analysis on the correlated data further comprises applying spatial panoramas or trend analysis to identify other middlebox device types that are relatively highly failure prone and other middlebox models that are relatively highly failure prone.

8. The computer-readable storage medium of claim 1, wherein the middlebox redundancy is evaluated for a redundancy group of the set of middlebox devices that has at least two individual instances of the individual middlebox device type.

9. A computer-implemented method, comprising:
    applying event filters to a dataset of middlebox error reports to separate redundant middlebox error reports from a remainder of the middlebox error reports of the dataset;
    categorizing the remainder of the middlebox error reports of the dataset by middlebox device type; and,
    generating a graphical user interface that conveys past reliability and predicted future reliability for an individual model of an individual middlebox device type.

10. The computer-implemented method of claim 9, further comprising correlating the remainder of the middlebox error reports with other middlebox-related data and performing the categorizing and the generating on data produced by the correlating.

11. The computer-implemented method of claim 9, further comprising determining a recommended replacement date for the individual model of the individual middlebox device type.

12. The computer-implemented method of claim 11, wherein the determining includes both site-up and cost-down considerations.

13. The computer-implemented method of claim 11, further comprising determining a recommended number of spares to maintain for the individual model of the individual middlebox device type.

14. A system, comprising:
    an event analysis component configured to evaluate datacenter middlebox error reports that relate to multiple types of middlebox devices and multiple models within an individual middlebox device type, and wherein the event analysis component is further configured to evaluate the middlebox device types and models from both a datacenter site-up perspective and a datacenter cost-down perspective.

15. The system of claim 14, wherein the event analysis component further comprises a middlebox error report filter module that is configured to create a filter pipeline from a set of available event filters that relate to time, redundancy, impact, and planned maintenance.

16. The system of claim 14, wherein the event analysis component further comprises a middlebox error report correlation module that is configured to correlate individual error reports with other middlebox-related data that is not obtained from the datacenter middlebox error reports.

17. The system of claim 14, wherein the event analysis component further comprises a middlebox recommendation module that is configured to predict future reliability of individual middlebox device models.

18. The system of claim 14, wherein the event analysis component further comprises a middlebox recommendation module that is configured to recommend a replacement date for individual middlebox device models.

19. The system of claim 14, wherein the system is manifest on a single computer.

20. The system of claim 14, wherein the datacenter middlebox error reports relate to a single datacenter and the system comprises the single datacenter, or wherein the datacenter middlebox error reports relate to multiple datacenters and the system comprises the multiple datacenters, or wherein the datacenter middlebox error reports relate to the single datacenter and the system does not include the single datacenter, or wherein the datacenter middlebox error reports relate to multiple datacenters and the system does not include the multiple datacenters.

21. The system of claim 14, further comprising at least one hardware processor configured to execute computer-readable instructions of the event analysis component.

* * * * *